United States Patent [19]
Gulick et al.

[11] Patent Number: 6,014,709
[45] Date of Patent: Jan. 11, 2000

[54] MESSAGE FLOW PROTOCOL FOR AVOIDING DEADLOCKS

[75] Inventors: Robert C. Gulick, Glenmore, Pa.; Mitchell A. Bauman, Circle Pines, Minn.; Douglas E. Morrissey, Allentown, Pa.

[73] Assignee: Unisys Corporation, Blue Bell, Pa.

[21] Appl. No.: 08/964,606

[22] Filed: Nov. 5, 1997

[51] Int. Cl.$^7$ .................................................. G06F 13/00
[52] U.S. Cl. .......................................... 709/235; 370/229
[58] Field of Search ..................................... 709/200, 201, 709/224, 235; 370/229, 230, 231, 232, 233, 235, 236, 237

[56] References Cited

U.S. PATENT DOCUMENTS

| | | | |
|---|---|---|---|
| 3,641,505 | 2/1972 | Artz et al. | 340/172.5 |
| 3,768,074 | 10/1973 | Sharp et al. | 340/172.5 |
| 3,812,469 | 5/1974 | Hauck et al. | 340/172.5 |
| 4,000,485 | 12/1976 | Barlow et al. | 340/172.5 |
| 4,240,143 | 12/1980 | Besemer et al. | 364/200 |
| 4,245,306 | 1/1981 | Besemer et al. | 364/200 |
| 4,253,144 | 2/1981 | Bellamy et al. | 364/200 |
| 4,253,146 | 2/1981 | Bellamy et al. | 364/200 |
| 4,392,196 | 7/1983 | Glenn et al. | 364/200 |
| 4,441,155 | 4/1984 | Fletcher et al. | 364/200 |
| 4,464,717 | 8/1984 | Keeley et al. | 364/200 |
| 4,466,059 | 8/1984 | Bastian et al. | 364/200 |
| 4,488,217 | 12/1984 | Binder et al. | 364/200 |
| 4,562,536 | 12/1985 | Keeley et al. | 364/200 |

(List continued on next page.)

FOREIGN PATENT DOCUMENTS

| | | |
|---|---|---|
| 0 752 667 | 1/1997 | European Pat. Off. . |
| WO 95/25306 | 9/1995 | WIPO . |
| WO 96/35172 | 11/1996 | WIPO . |

OTHER PUBLICATIONS

"Exemplar System Architecture" from http://www.hp/com/wsg/products/servers/exemplar/sx–class/exemplar.htm, Downloaded Feb. 12, 1998. (Date of Publication unknown).

Stenstrom et al., "Trends in Shared Memory Multiprocessing", Computer, Dec. 1997, pp. 44–50.

Burroughs Corporation, "B6800" Multiprocessor System, Aug. 21, 1979, B 6000 Series Systems Notes, Mark III.1 Release, Sep. 1979, pp. 53–84.

Stenstrom, et al., "Boosting the Performance of Shared Memory Multiprocessors," Computer, Jul. 1997, pp. 63–70.

M.S. Yousif, et al., "Cache Coherence in Multiprocessor: A Survey," Advances in Computers, vol. 10, 1995, pp. 127–179.

Fred R. Goldstein, "Congestion Control in Frame Relay Networks Using Explicit Binary Feedback," Conference Proceedings, Mar. 27–30 , 1991, pp. 558–564.

IBM Technical Disclosure Bulletin, "Compact Global Table for Management of Multiple Caches," vol. 32, No. 7, Dec. 1, 1989, pp. 322–324.

*Primary Examiner*—Moustafa M. Meky
*Attorney, Agent, or Firm*—Steven B. Samuels; Mark T. Starr; Rocco L. Adornato

[57] ABSTRACT

System and method for controlling the flow of messages in a computer system to minimize congestion and prevent deadlocks in communications. The computer system includes a main memory, a plurality of crossbar switches, a plurality of third level caches, and a plurality of input/output modules, which are interconnected via the communications network of the computer system. System and method prevents deadlocks between input/output modules and main memory, and between processors and main memory caused by data needed for making forward progress in processing being trapped behind messages. System and method utilize control signals and auxiliary buffers to hold and redirect messages out of the path of data so that data may flow to the input/output modules and processors when needed, and messages may flow when convenient.

31 Claims, 30 Drawing Sheets

U.S. PATENT DOCUMENTS

| | | | |
|---|---|---|---|
| 4,564,903 | 1/1986 | Guyette et al. | 364/300 |
| 4,586,133 | 4/1986 | Steckler | 364/200 |
| 4,667,288 | 5/1987 | Keeley et al. | 364/200 |
| 4,686,621 | 8/1987 | Keeley et al. | 364/200 |
| 4,843,541 | 6/1989 | Bean et al. | 364/200 |
| 4,875,155 | 10/1989 | Iskiyan et al. | 364/200 |
| 4,929,940 | 5/1990 | Franaszck et al. | 340/825.02 |
| 4,967,414 | 10/1990 | Lusch et al. | 371/51.1 |
| 5,016,167 | 5/1991 | Nguyen et al. | 364/200 |
| 5,047,920 | 9/1991 | Funabashi | 364/200 |
| 5,060,136 | 10/1991 | Furney et al. | 364/200 |
| 5,067,071 | 11/1991 | Schanin et al. | 395/275 |
| 5,142,676 | 8/1992 | Fried et al. | 395/425 |
| 5,237,670 | 8/1993 | Wakerly | 395/425 |
| 5,251,308 | 10/1993 | Frank et al. | 395/425 |
| 5,257,361 | 10/1993 | Doi et al. | 395/425 |
| 5,276,884 | 1/1994 | Mohan et al. | 395/700 |
| 5,297,269 | 3/1994 | Donaldson et al. | 711/145 |
| 5,327,538 | 7/1994 | Hamaguchi et al. | 395/325 |
| 5,392,416 | 2/1995 | Doi et al. | 395/425 |
| 5,408,629 | 4/1995 | Tsuchiva et al. | 395/425 |
| 5,465,336 | 11/1995 | Imai et al. | 395/375 |
| 5,490,280 | 2/1996 | Gupta et al. | 395/800 |
| 5,497,472 | 3/1996 | Yamamoto et al. | 395/427 |
| 5,499,354 | 3/1996 | Aschoff et al. | 395/456 |
| 5,504,874 | 4/1996 | Galles et al. | 395/472 |
| 5,537,569 | 7/1996 | Masubuchi | 395/448 |
| 5,559,970 | 9/1996 | Sharma | 710/132 |
| 5,568,663 | 10/1996 | Boudou et al. | 395/468 |
| 5,581,725 | 12/1996 | Nakayama | 395/449 |
| 5,687,013 | 11/1997 | Henmi | 370/237 |
| 5,717,897 | 2/1998 | McCrory | 395/468 |
| 5,717,942 | 2/1998 | Haupt et al. | 395/800 |

MI BUS TO MI/O BUS MESSAGE FLOW

MI/O BUS TO MT BUS MESSAGE FLOW

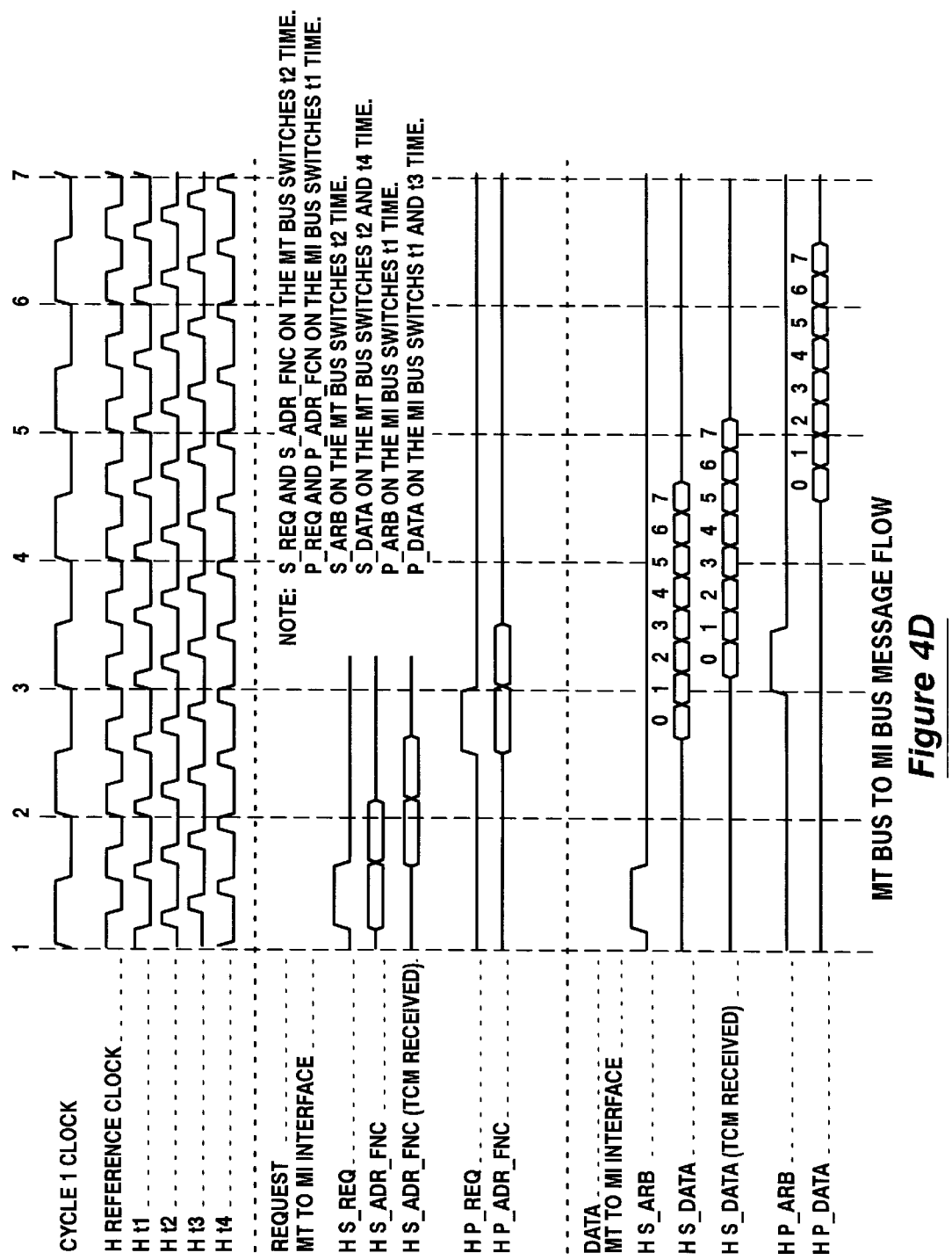
Figure 4D MT BUS TO MI BUS MESSAGE FLOW

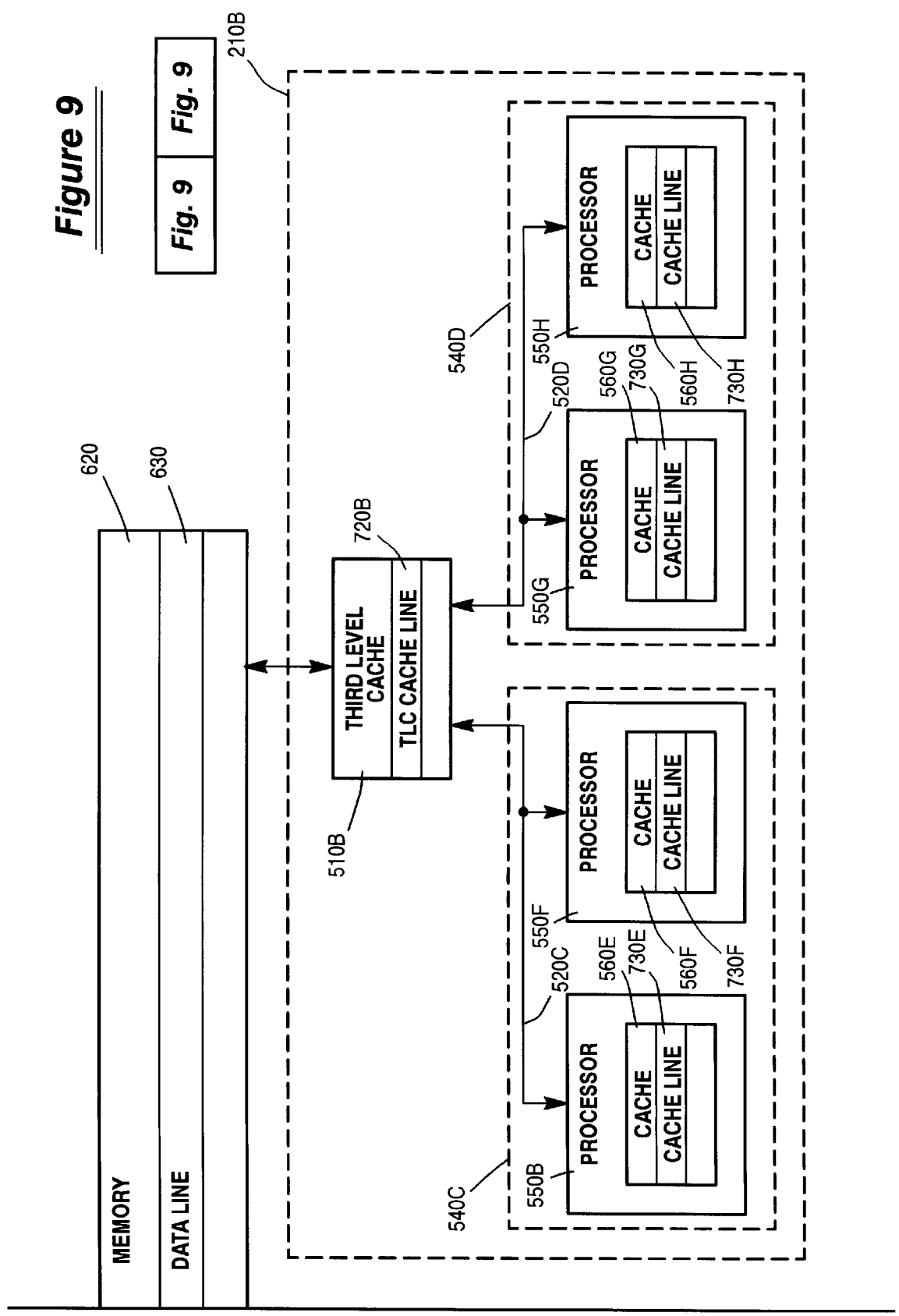

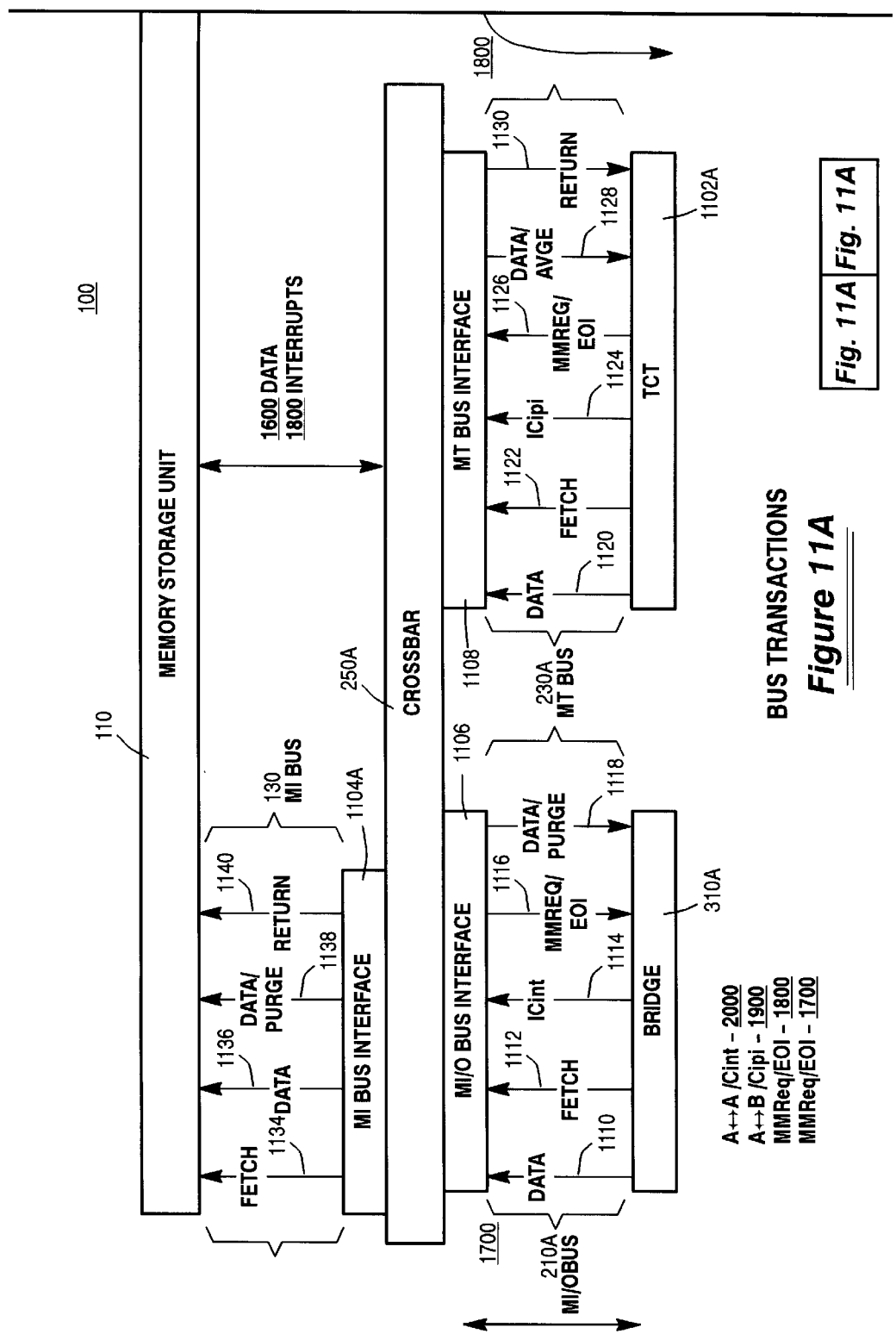

BUS TRANSACTIONS

| *Fig. 11A* | *Fig. 11B* |

HOLD SIGNALS

HOLD SIGNALS

*MMREQ/EOI 250A*

MMREG/EOI 250A−250B

*ICipi 1102A−1102B*

ICint 310A-1102A

ICint 310B-1102A

MESSAGE FLOW PROTOCOL FOR AVOIDING DEADLOCKS

CROSS-REFERENCE TO OTHER APPLICATIONS

The following applications have a common assignee and contain some common disclosure:

"A Directory-Based Cache Coherency System," Ser. No. 08/965,004, still pending, filed herewith and incorporated herein by reference in its entirety;

"Split Lock Operation to Provide Exclusive Access to Memory During Non-Atomic Operations," Ser. No. 08/964,623, still pending, filed herewith and incorporated herein by reference in its entirety;

"Memory Bit Optimization," Ser. No. 08/964,626, still pending, filed herewith and incorporated herein by reference in its entirety; and "System and Method for Providing Speculative Arbitration for Transferring Data," Ser. No. 08/964,630, still pending, filed herewith and incorporated herein by reference in its entirety.

BACKGROUND OF THE INVENTION

1. Field of the Invention

The present invention relates to a computer system and, in particular, to a system and method for controlling the flow of messages to minimize congestion and prevent deadlocks in communications.

2. Related Art

A typical computer system has a number of nodes, each node having a processor, a memory, one or more input/output (I/O) devices, and interfaces that connect all the nodes. Typical computer systems also have a communication scheme so that the nodes may talk to each other. Many computer systems communicate by passing messages among the nodes across a communications network within the computer system.

For example, suppose a first processor wants to read data from a memory of a second processor. Suppose also that the second processor wishes to read data from a memory of the first processor. In order to accomplish these two tasks, messages are sent between the first and second processors over the communications network. In the first instance, the first processor sends a request (to read data) to the second processor. When the request arrives at the second processor, the second processor must send a reply to the first processor. The reply may be that the second processor does not possess an accurate version of the requested data. Alternatively, the reply may include the requested data. In any event, the two processors communicate by passing messages between them.

Message passing systems may become congested as a result of too much message traffic passing between two particular nodes, for example. This congestion can create a deadlock condition in the communications network. Deadlock exists when messages in the communications network can make no forward progress.

SUMMARY OF THE INVENTION

The present invention is directed to a system and method for controlling the flow of messages within a computer system. The present invention utilizes control signals and auxiliary buffers to hold and redirect messages out of the path of data so that data may flow to the input/output modules and processors when needed, and messages may flow when convenient. As such, the present invention minimizes congestion within the computer system and prevents deadlocks in communications.

The computer system in which the present invention operates includes the a plurality of memory storage units. The memory storage units are coupled to a plurality of processing modules via a memory storage unit interface bus. Each processing module includes at least one crossbar switch coupled to at least two sub-processing modules.

Each sub-processing module includes at least one third level cache. The crossbar switches are coupled to the sub-processing modules via a third level cache bus. Each sub-processing module includes at least one third level cache coupled to a plurality of coherency domains. Each coherency domain includes a plurality of second level caches and a plurality of processors. The third level caches and the coherency domains, including the second level caches and the processors are connected via a processor bus.

The crossbar switch in the processing module is also coupled to at least one input/output module via an input/output bus. Each input/output module includes at least one bridge coupled to at least one peripheral component via a peripheral component interconnect bus.

In a preferred embodiment, the present invention includes two memory storage units coupled to two processing modules. Each processing unit is coupled to two input/output modules, and includes one crossbar switch and two sub-processing modules. Each input/output module includes one bridge and three peripheral components. Each sub-processing module includes one third level cache, four second level caches, and four processors.

The present invention controls congestion when sending data among a first and a second third level cache and the memory storage unit. After a message is sent from the first third level cache to the first crossbar switch, the present invention determines that the message is a data message. The present invention then determines whether the flow of data messages from the first crossbar switch to an associated memory storage unit is prohibited. If the flow of data messages from the first crossbar switch to an associated memory storage unit is not prohibited, the present invention sends the data message to the memory storage unit, and determines whether the data message in the memory storage unit is one of a data transfer, a purge request, or a return request. If the data message in the memory storage unit is one of a data transfer, a purge request, or a return request, then the present invention determines whether the flow of one of a data transfer, a purge request, or a return request from the memory storage unit to a second crossbar switch is precluded. If the flow of one of a data transfer, a purge request, or a return request from the memory storage unit to a second crossbar switch is not prohibited, the present invention then sends the data message from the memory storage unit to the second third level cache via the second crossbar switch.

Further features and advantages of the invention, as well as the structure and operation of various embodiments of the invention, are described in detail below with reference to the accompanying drawings.

BRIEF DESCRIPTION OF THE FIGURES

The invention is best understood by reference to the figures wherein references with like reference numbers indicate identical or functionally similar elements. In addition, the left-most digits refer to the figure in which the reference first appears in the accompanying drawings in which:

FIG. 4A through FIG. 4D are timing diagrams depicting the flow of messages in the system platform of the present invention;

DETAILED DESCRIPTION OF THE PREFERRED EMBODIMENTS

Table of Contents

I. Introduction
II. Example Environment
III. Caching Scheme
IV. Message Passing
   A. Structure
   B. Messages
   C. HOLD Signals
   D. Message Flow Control for Minimizing Congestion
      1. Message Flow Across MI Bus 130
      2. Deadlock
V. Message Flow Protocol for Avoiding Deadlocks
   A. Structure
   B. Deadlock Avoidance Message Flow Across MI/O Bus 230
   C. Deadlock Avoidance Message Flow From TCT 1102A to Bridge 310A
   D. Deadlock Avoidance Message Flow From TCT 1102A to Bridge 310B
   E. Deadlock Avoidance Message Flow From TCT 1102A to TCT 1102B
   F. Deadlock Avoidance Message Flow From Bridge 310A to TCT 1102A
   G. Deadlock Avoidance Message Flow From Bridge 310A to TCT 1102B
VI. Conclusion

I. INTRODUCTION

The present invention is directed towards a system and method for controlling the flow of messages in a computer system to minimize congestion and prevent deadlocks in communications. The present invention prevents deadlocks between I/O and main memory, and between processors and main memory caused by data needed for making forward progress in processing being trapped behind messages. The present invention uses control signals and auxiliary buffers to hold and redirect messages out of the path of data so that data may flow to the I/O and processors when needed, and messages may flow when convenient.

II. EXAMPLE ENVIRONMENT

Figure 1:
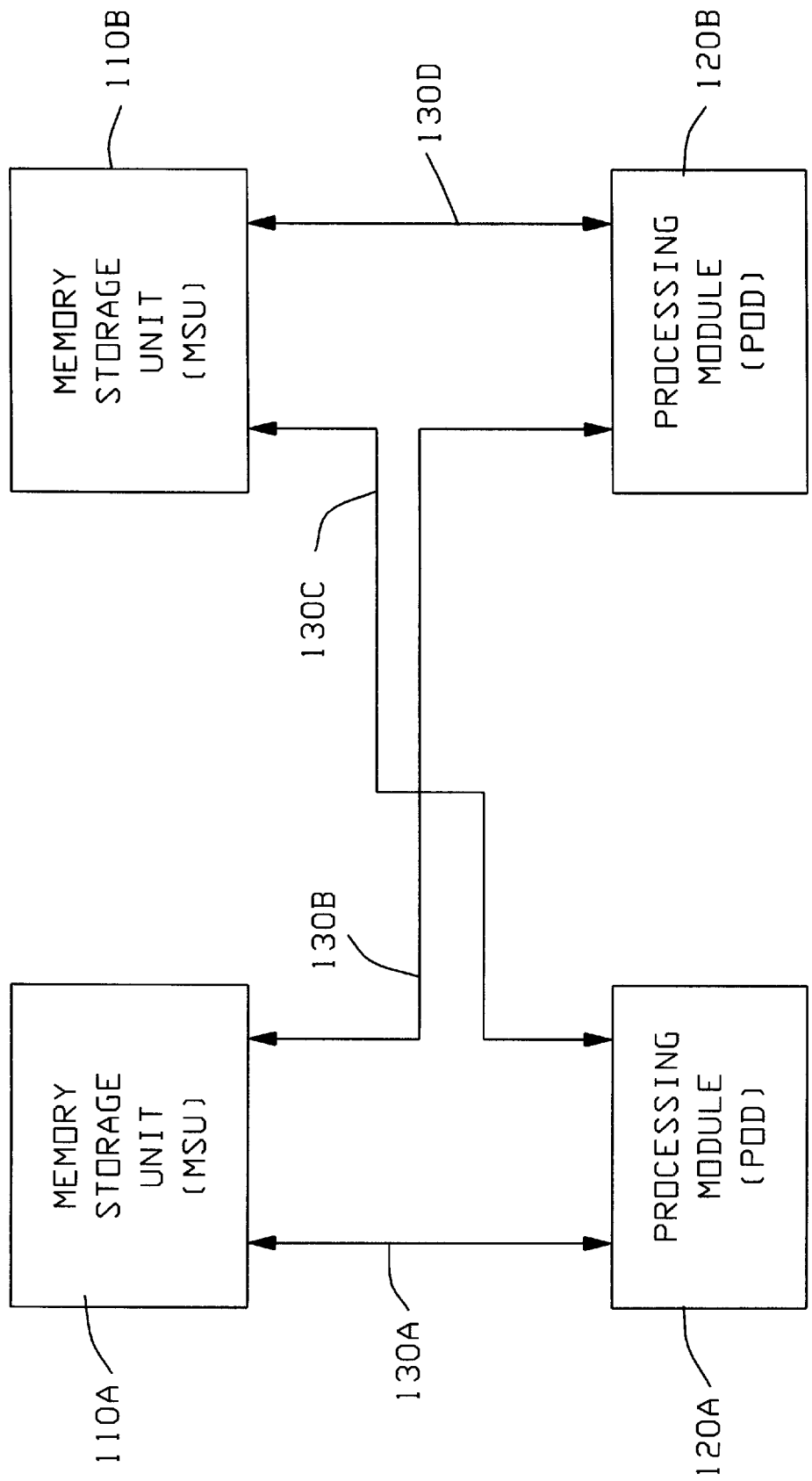
FIG. 1 illustrates an example environment of a system platform useful for passing messages among multiple processing units and multiple memory storage units.

FIG. 1 illustrates an example environment of a system platform 100 useful for passing messages among multiple processing units and multiple memory storage systems. System platform 100 includes one or more memory storage units (MSUs) 110, one or more processing modules (PODs) 120, and one or more MSU interface (MI) buses 130. MSUs 110 communicate with PODs 120 via MI bus 130.

In a preferred embodiment of the present invention, Intel Pentium Pro Family processors and future Intel processors are utilized. However, the present invention is not limited to this embodiment. For example, the present invention may be implemented using various processors (e.g., A series (Capricorn), 2200 (Voyager), and UNIX/NT (TITAN) systems). Moreover, the present invention may be described with reference to one MSU, one POD (processors and caches), and one I/O subsystem. However, a preferred embodiment of the present invention utilizes a plurality of MSUs, a plurality of PODs, and a plurality of I/O subsystems.

MI bus 130 includes one or more dedicated (or point to point) links (not shown individually) to transfer messages throughout system platform 100. Each of the links in each of the MI buses 130 begins with a point of origin (or source) and ends at a point of destination.

POD 120 has direct access to data in any MSU 110 via one of MI buses 130. For example, MI bus 130A allows POD 120A direct access to MSU 110A, and MI bus 130C allows POD 120A direct access to MSU 110B. Pod 120 and MSU 110 are discussed in further detail below.

Figure 2:
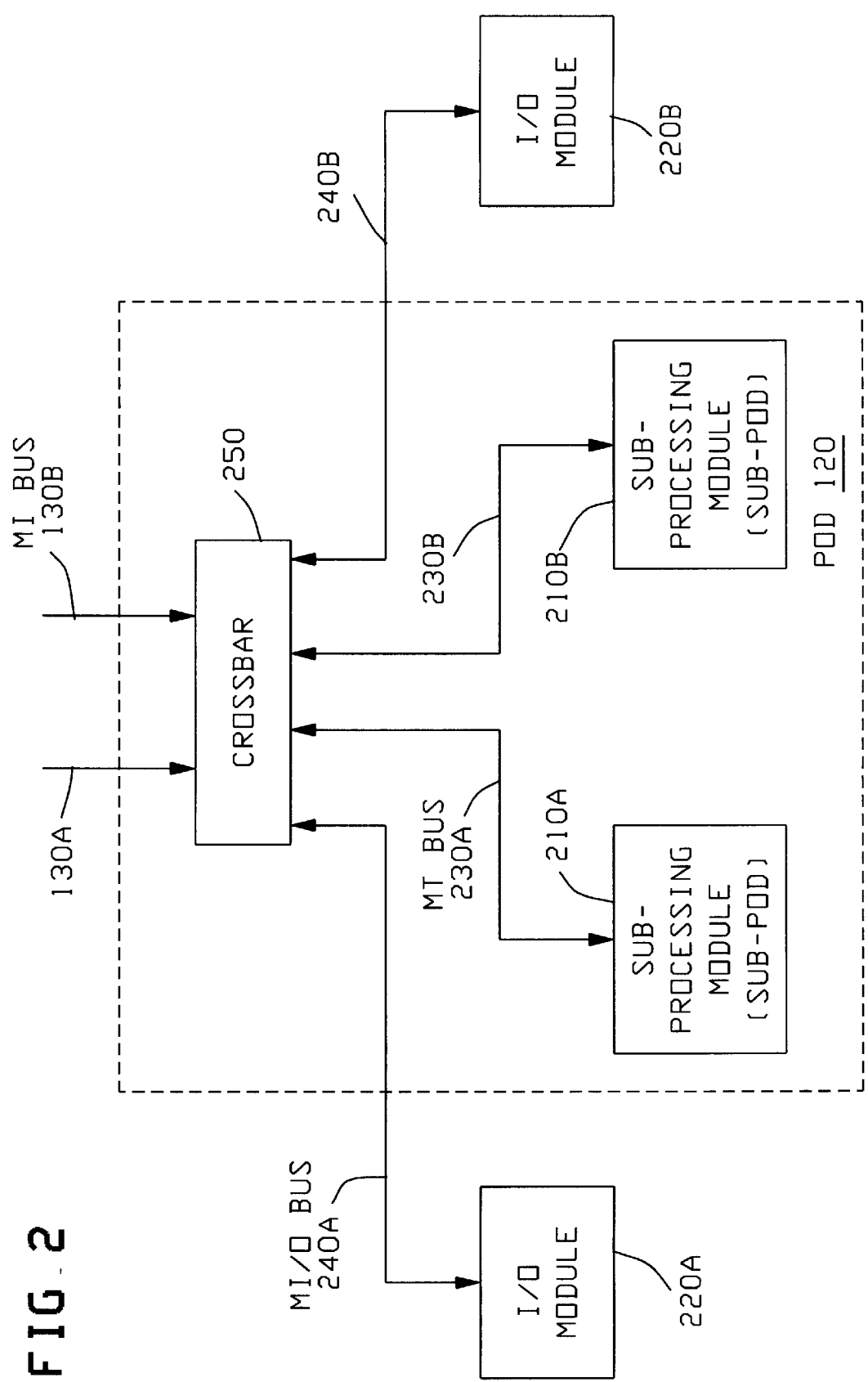
FIG. 2 illustrates the interconnectivity of a plurality of PODs.

FIG. 2 illustrates the interconnectivity of PODs 120 in further detail. PODs 120 include one or more crossbars 250 and one or more sub-processing modules (sub-PODs) 210. Crossbars 250 are interconnected to sub-PODs 210 via one or more third level cache (MT) buses 230. Crossbars 250 are interconnected with one or more input/output (I/O) modules 220 via one or more input/output (MI/O) buses 240.

Crossbar 250 is an interconnection switch matrix that allows any node within the switch matrix to communicate with any other node within the switch matrix in one pass through the interconnection switch matrix. That is, crossbar 250 allows communication directly from source to destination without intermediate nodes to interfere with messages or data.

In a preferred embodiment, crossbar 250 supports high-bandwidth data buses, and memory-mapped I/O and interrupt delivery using message passing. For example, crossbar 250 routes messages through nodes on MI bus 130, MT bus 230, and MI/O bus 240. Crossbar 250 also provides a message and data path from sub-PODs 210 to either I/O modules 220 or sub-PODs 210 and back. Crossbar 250 can simultaneously route any permutation of traffic pattern between nodes. That is, crossbar 250 can route messages and data from I/O module 220A, across MI/O bus 240A, through MSU 110A, across MI bus 130B, back down through crossbar 250, across MT bus 230B, to a node in sub-POD 210B, for example. Switch matrix technology is well known in the art and for the sake of brevity will not be described in any further detail herein.

Figure 3:
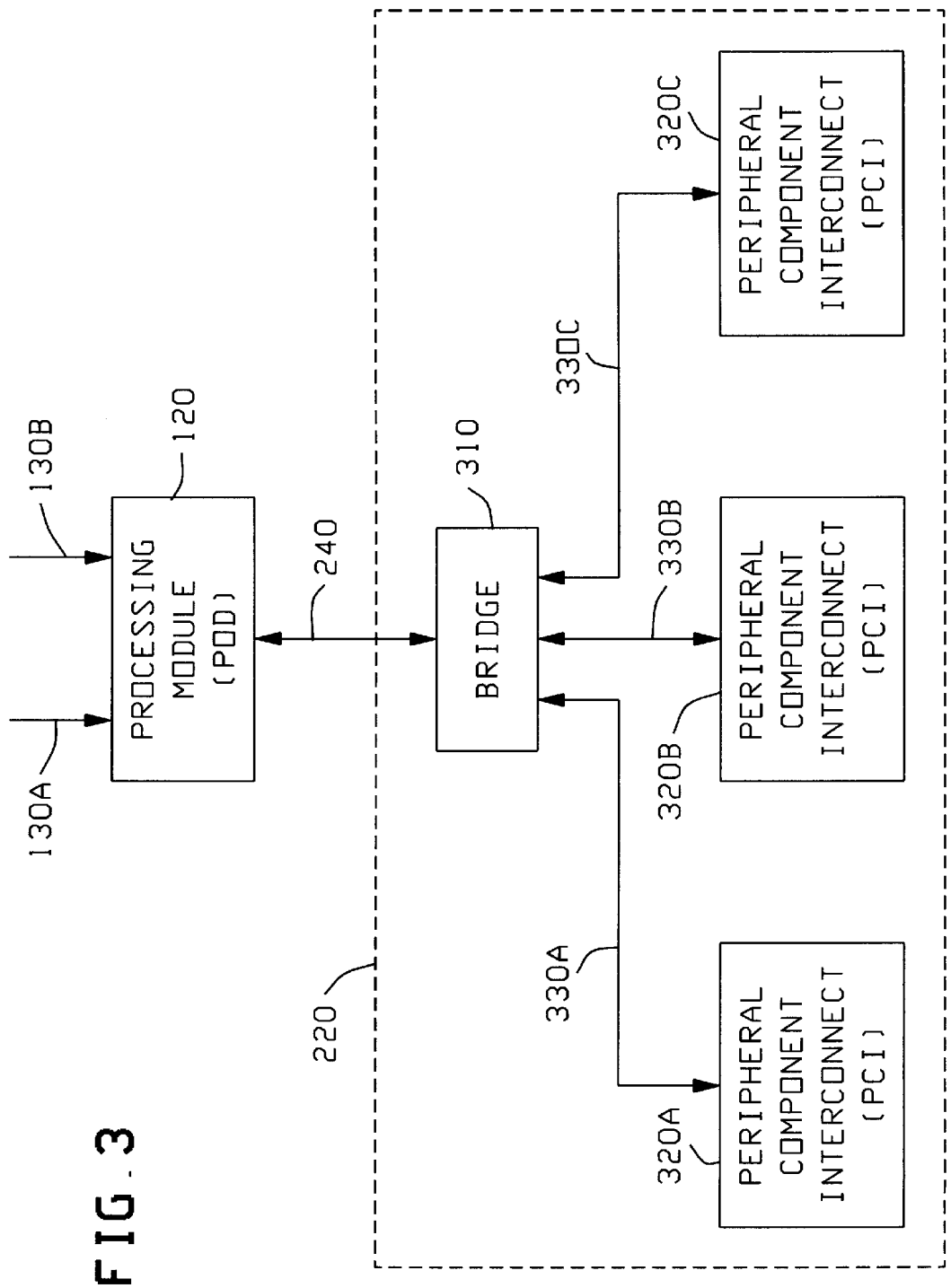
FIG. 3 illustrates the interconnectivity of an I/O module.

FIG. 3 illustrates the interconnectivity of I/O module 220 in further detail. I/O module 220 includes one or more bridges 310, one or more peripheral components 320, and one or more peripheral component interconnect buses (PCI buses) 330. MI/O bus 240 connects bridge 310 with POD 120. PCI bus 330 interconnects peripheral components 320 with I/O module 220.

Bridge 310 is, in general, a device that connects two networks of the same type. Bridge 310 allows transactions on one bus to be completed on a remote bus. Bridge 310 provides communication protocol conversion, provides interrupt handling and split transactions, and serves as a cache and memory agent. Bridge 310, in a preferred embodiment, allows messages and data on MI/O bus 240 to be passed to PCI bus 330. Bridge technology is well known in the art and for the sake of brevity will not be described in any further detail herein.

PCI bus 330, in general, is a high-bandwidth processor independent bus that can function as a platform itself for a peripheral bus. PCI bus 330 is capable of supporting other buses to which it is attached.

Peripheral component 320 is, in general, an input/output (I/O) device or a separate bus that interconnects an I/O device. Typical peripheral components 320 include graphic display modules, local disk drives, printers, CD ROMs, local area networks (LAN), sound modules, and small computer system interfaces (SCSI). A SCSI is itself a type of bus used to support I/O devices. In a preferred embodiment, peripheral component 320 is a SCSI or a LAN.

Figure 4A:
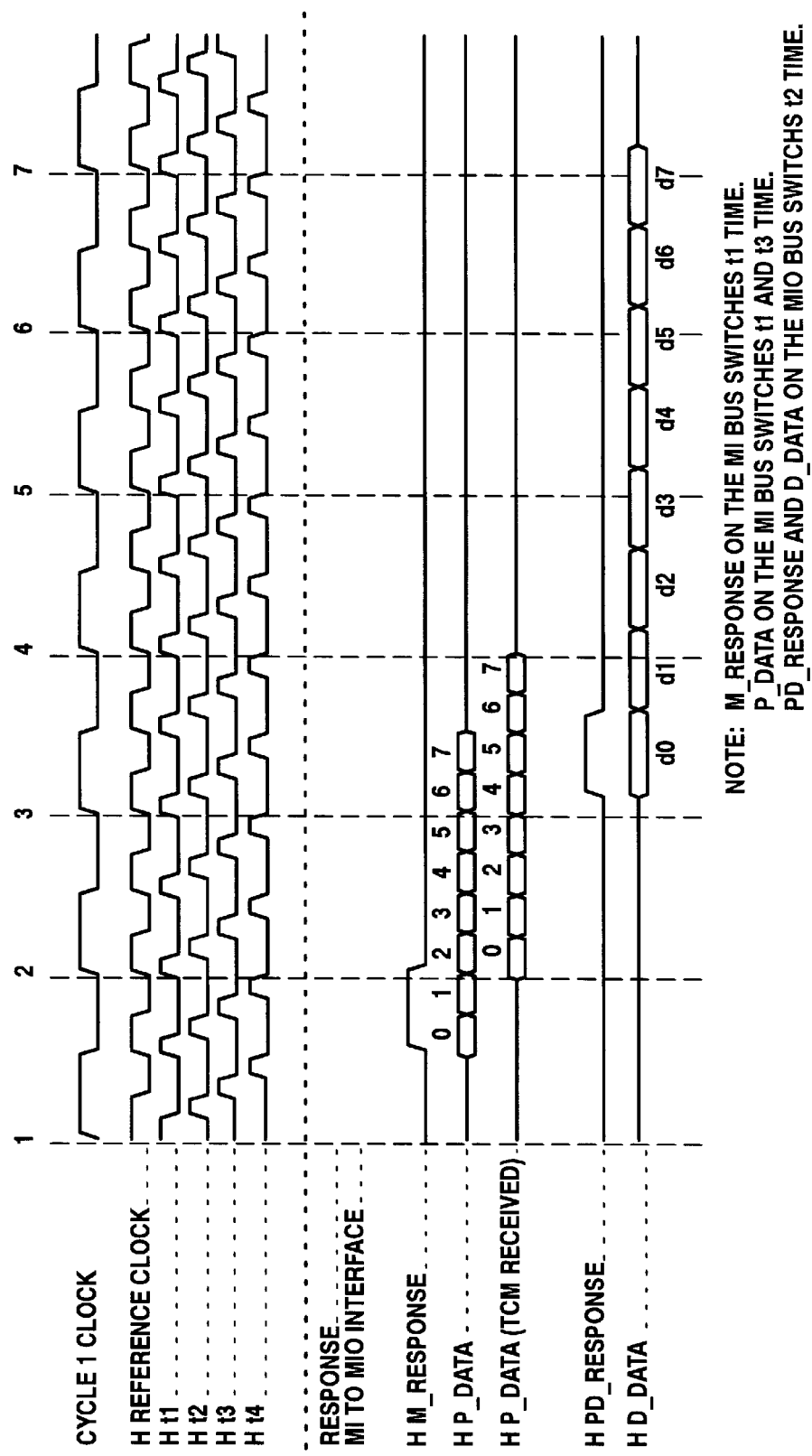
Figure 4B:
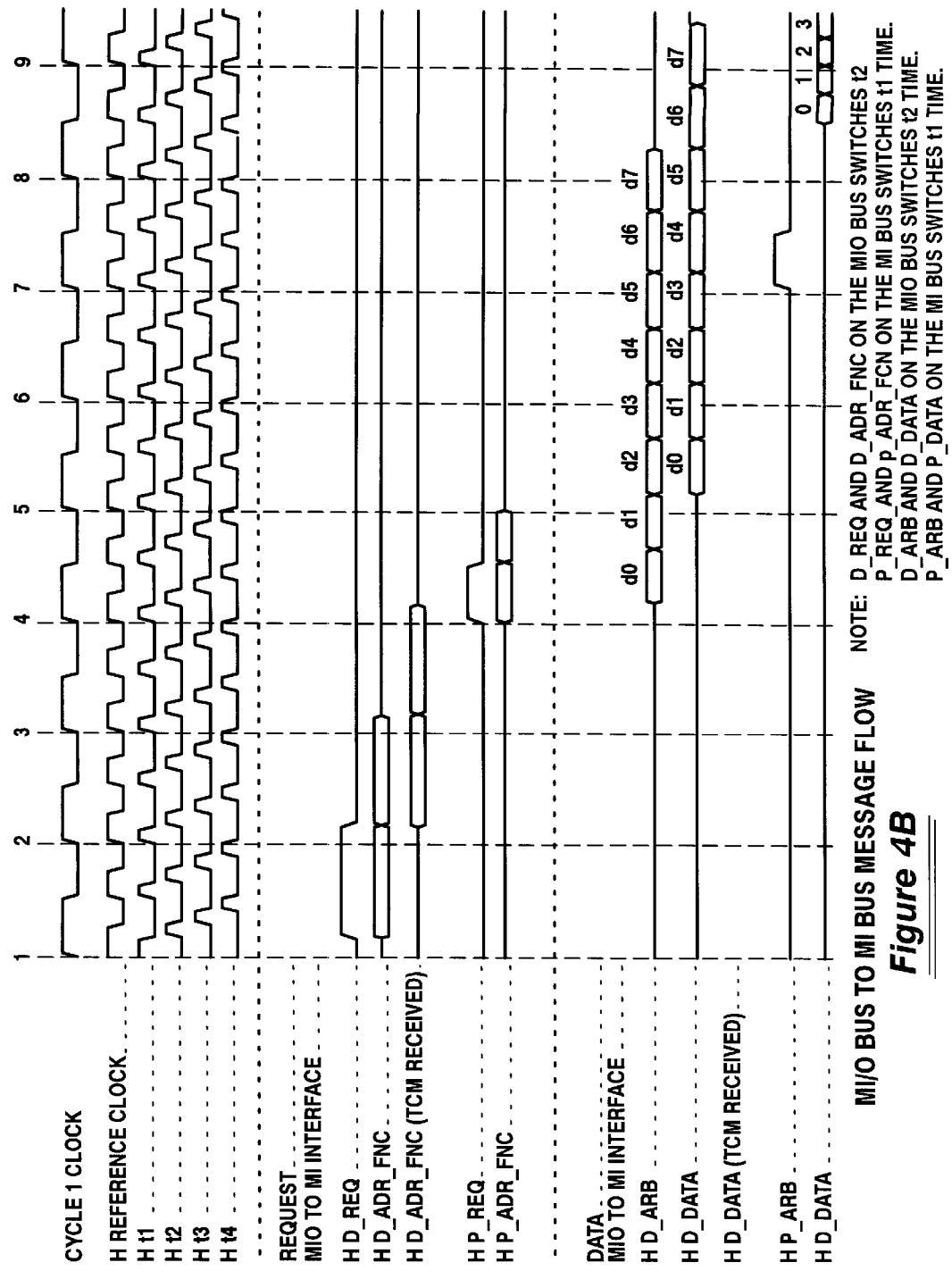
Figure 4C:
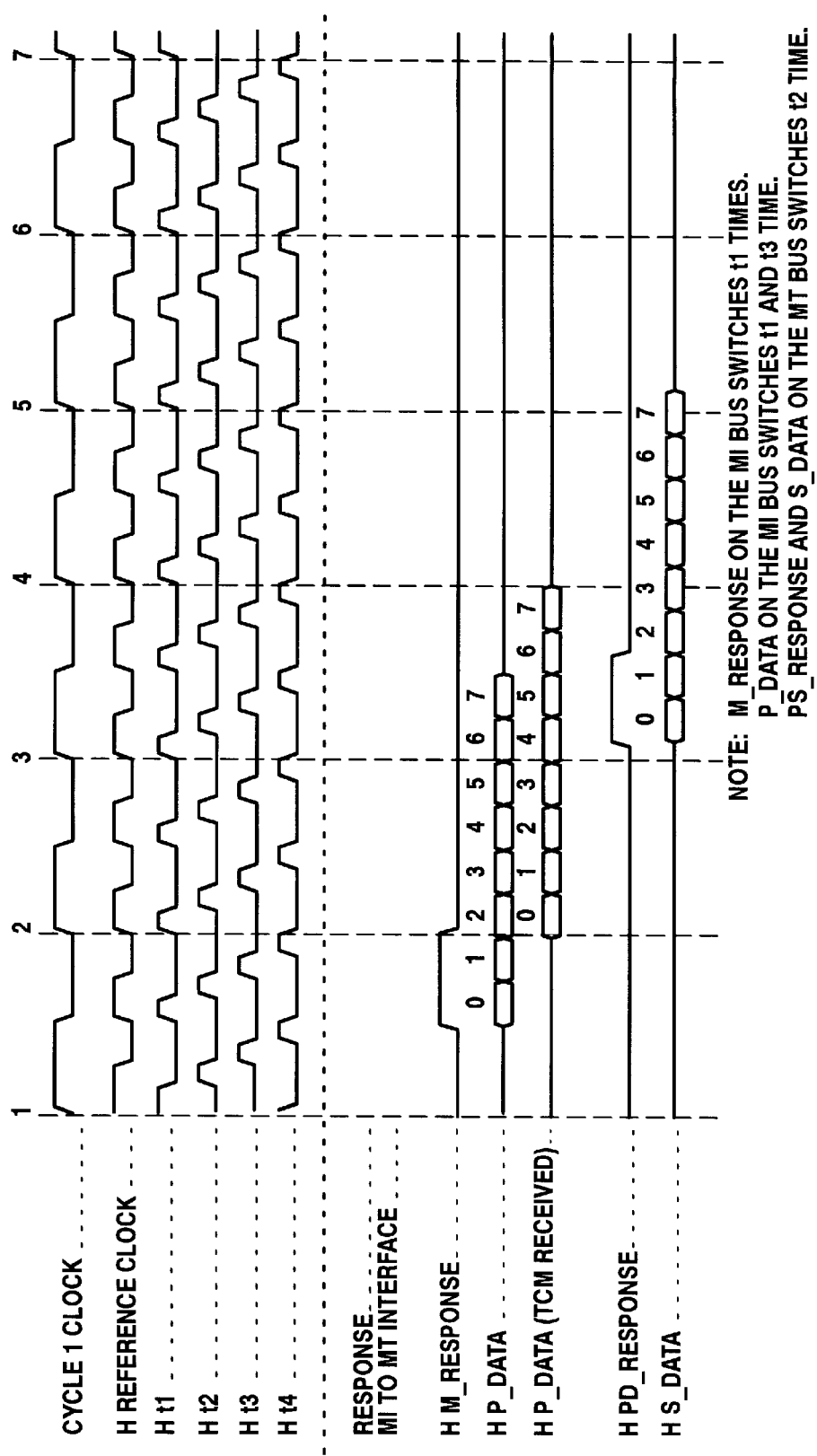

FIG. 4A through FIG. 4D are timing diagrams depicting the flow of messages in the system platform of the present invention. FIG. 4A illustrates the timing of message flow from MI bus 130 to MI/O bus 240. FIG. 4B illustrates the timing of message flow from MI/O bus 240 to MI bus 130. FIG. 4C illustrates the timing of message flow from MI bus 130 to MT bus 230. FIG. 4D illustrates the timing of message flow from MT bus 230 to MI bus 130.

Figure 5:
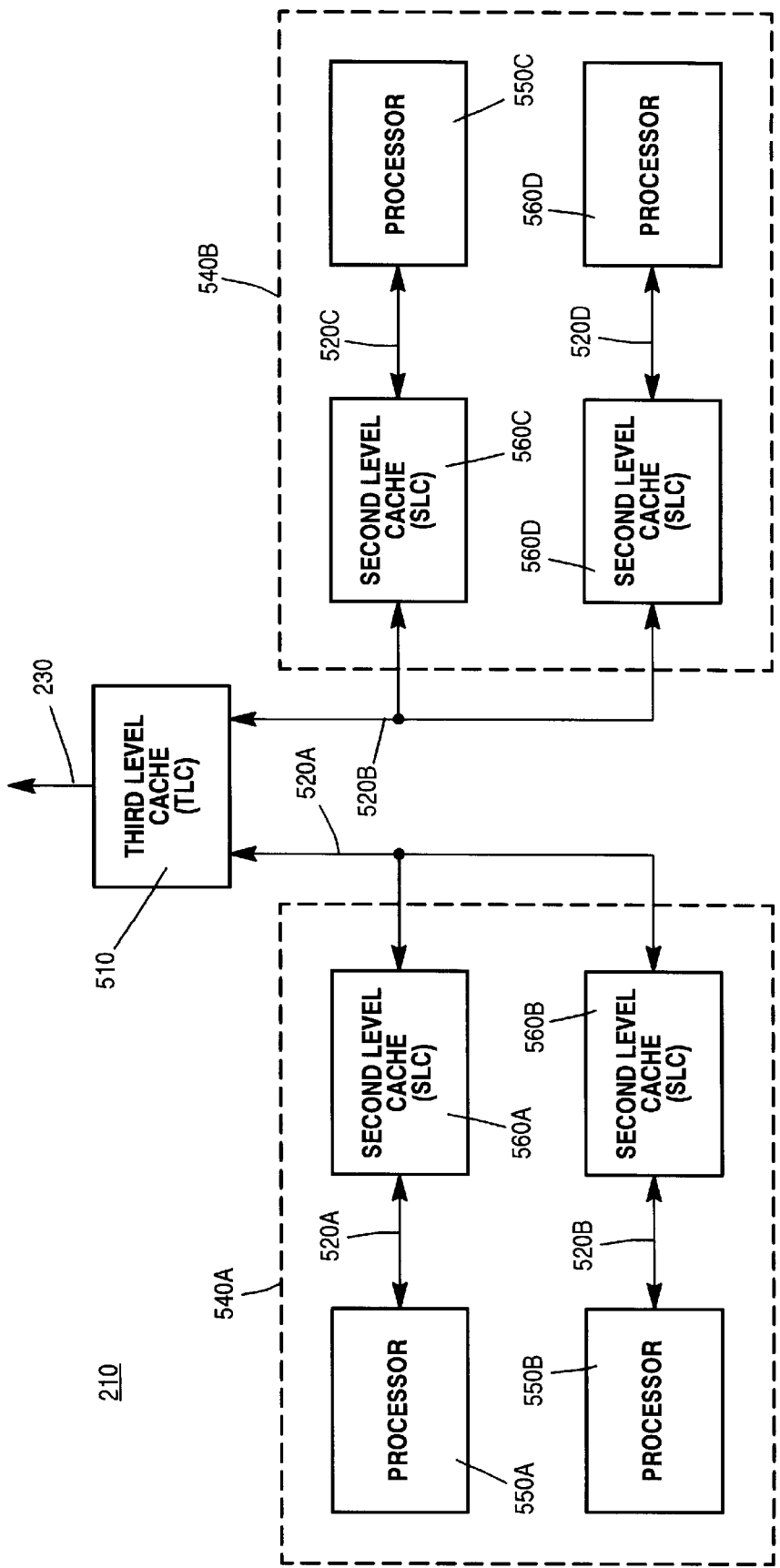
FIG. 5 illustrates an embodiment of a sub-POD.

FIG. 5 illustrates an embodiment of sub-POD 210 in further detail. In this embodiment, sub-POD 210 includes a third level cache 510 and one or more coherency domains 540. Third level cache 510 is connected to each coherency domain 540 via processor bus 520. Third level cache 510 maintains coherence among all coherency domains 540.

In a preferred embodiment, sub-POD 210 supports Intel Pentium Pro Family processors and future Intel compatible processors, two compatible buses, with two processors per bus, (or four processors per sub-POD), and programmable interrupt controller functions.

In this embodiment of the present invention each coherency domain 540 includes two or more hierarchies of caches 560 and a processor 550 connected to each second level cache 560 via bus 570. Second level caches 560 in each coherency domain 540 maintain coherence within their own coherency domain. In a preferred embodiment of the present invention, second level caches 560 in each coherency domain 540 maintain coherence amongst themselves as well. Cache coherency in this and other embodiments of the present invention are described in further detail in "Directory Based Cache Coherency System," Ser. No. 08/965,004, still pending, incorporated herein by reference in its entirety.

Figure 6:
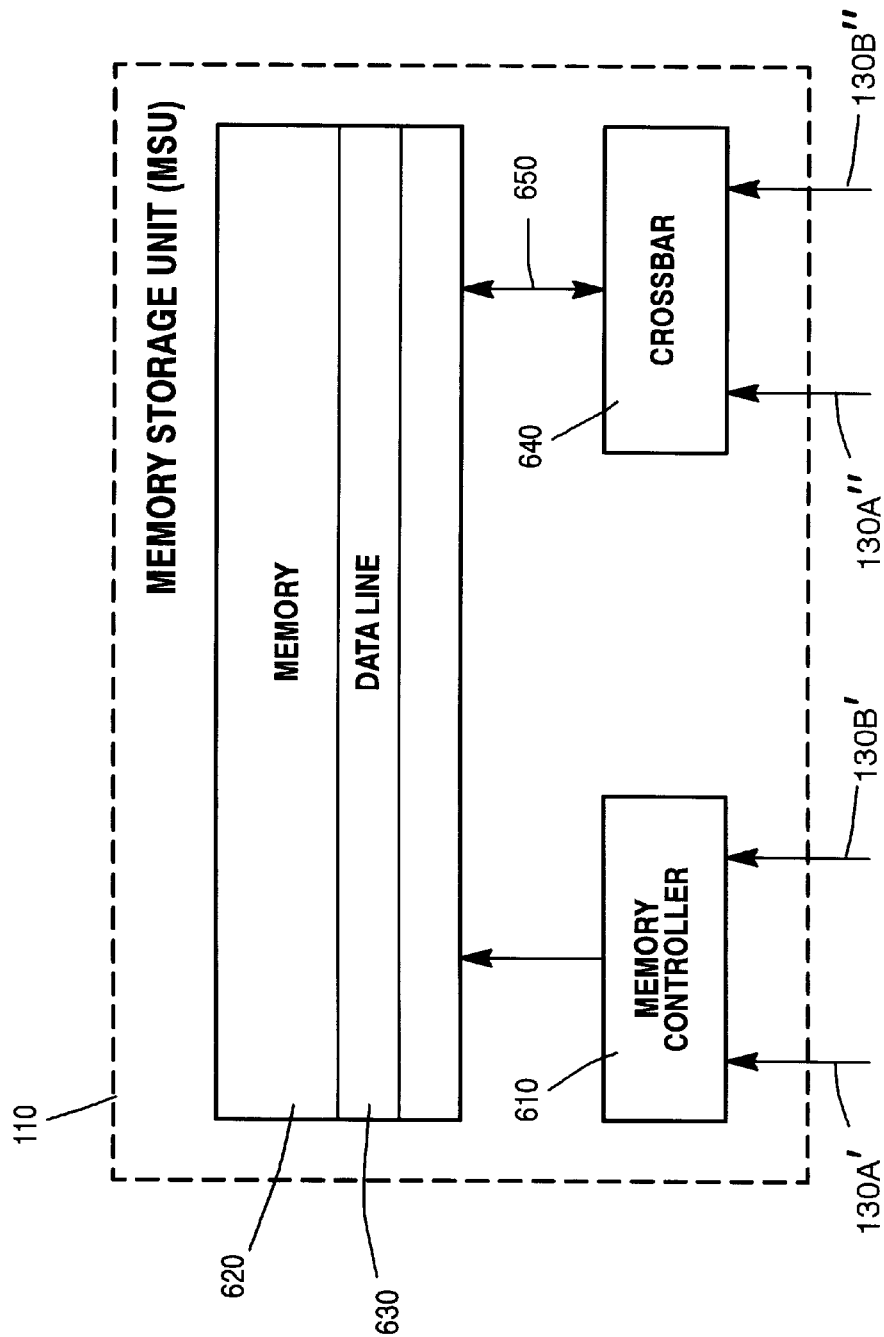
FIG. 6 illustrates a memory storage unit.

FIG. 6 illustrates MSU 110 in further detail. MSU 110 includes a memory controller 610, memory 620, and a memory crossbar 640. Memory 620 includes a plurality of data lines (shown as data line 630). Each data line 630 includes one or more addressable data storage locations for storing data. Data line 630 is the smallest quantum of data transferred among MSUs 110 and PODs 120 in system platform 100. In a preferred embodiment of the invention, data line 630 is comprised of eight data words (or 64 bytes).

Memory controller 610 operates as the memory manager of memory 620. Memory controller 610 receives the control and address lines of MI bus 130 from POD 120. Memory controller 610 controls and monitors the status of each data line 630. Memory controller 610 also controls memory crossbar 640.

Memory crossbar 640 is interconnected to the data lines of MI bus 130. Memory crossbar 640 functions as a switch between the data lines of MI bus 130 and the memory data bus 650. Memory crossbar 640 allows data from data lines 630 to flow from memory 620 to either one of PODs 120 in system platform 100 via MI bus 130.

Figure 7:
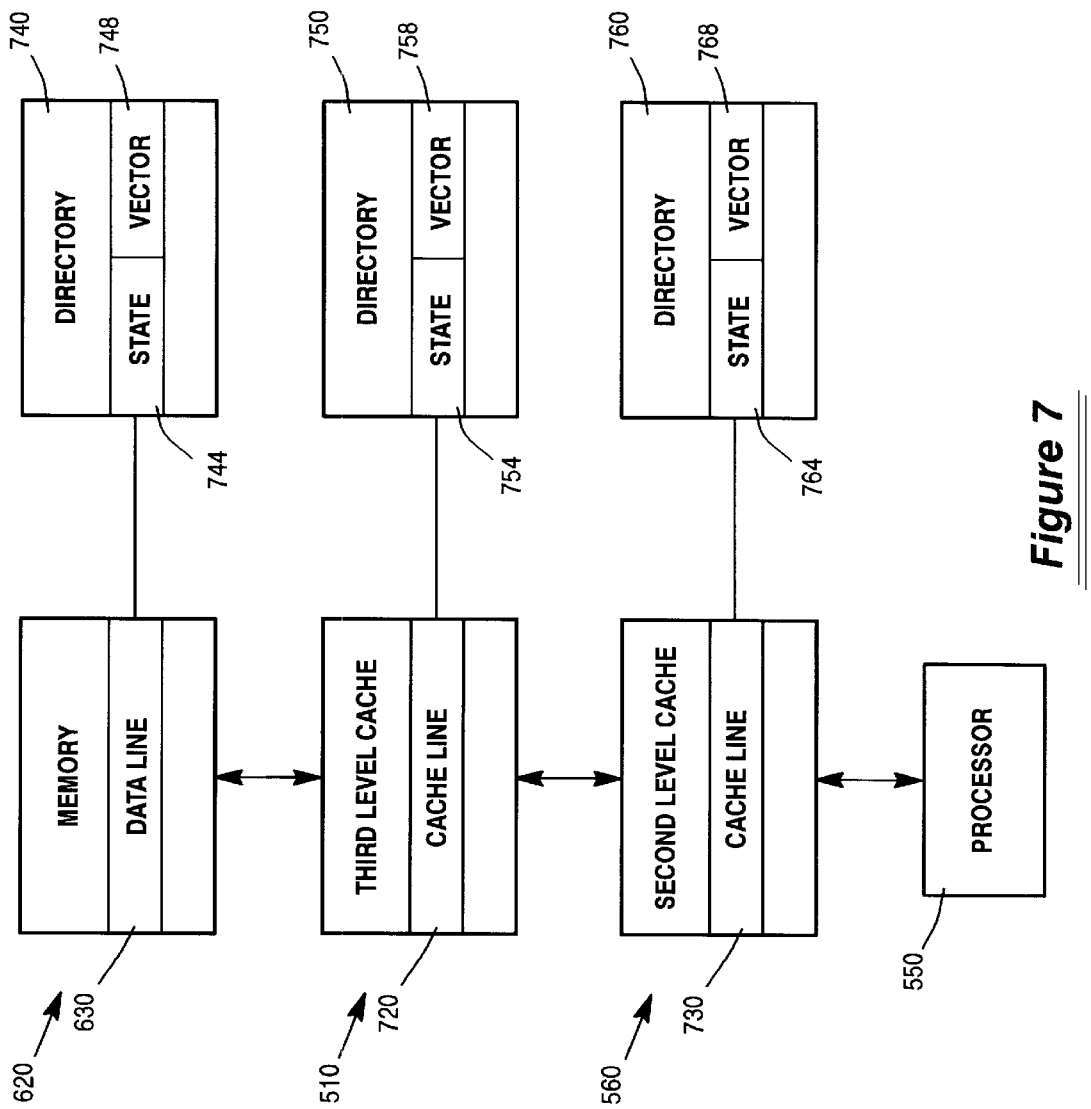
FIG. 7 illustrates an embodiment of a coherent protocol useful in the present invention.

FIG. 7 illustrates an embodiment of a coherency protocol useful in the present invention. In this embodiment, memory 620 and each level of cache (i.e., third level cache 510, second level cache 560, etc.) implement a directory protocol for maintaining coherency. As shown in FIG. 7, memory 620 has a memory directory 740, third level cache 510 has a third level cache directory 750, and second level cache 560 has a second level cache directory 760. The directory protocol is discussed in further detail in "Directory Based Cache Coherency System," Ser. No. 08/965,004, still pending, incorporated herein by reference in its entirety.

Figure 8:
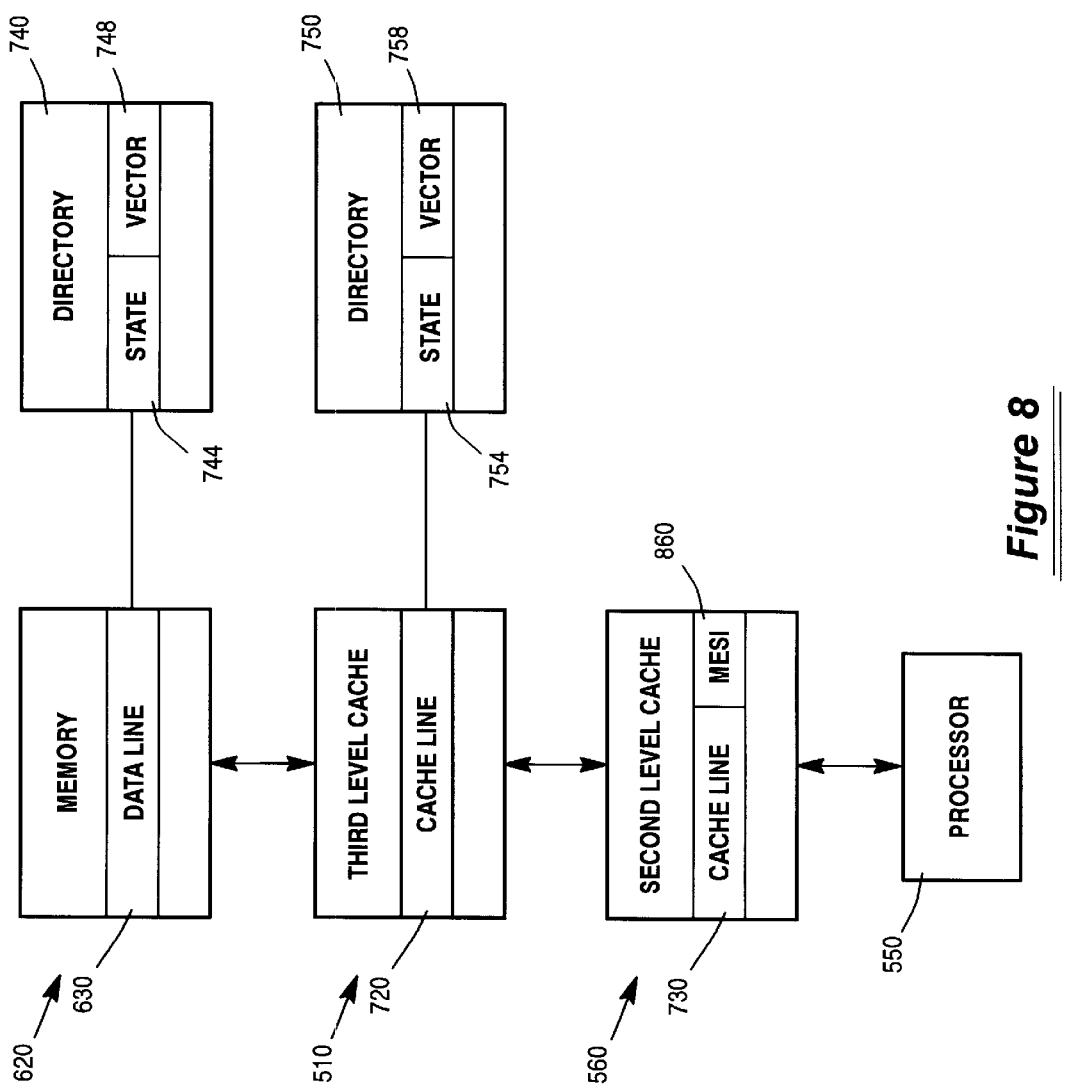
FIG. 8 illustrates an alternative embodiment of a coherence protocol useful in the present invention.

FIG. 8 illustrates another embodiment of a coherency protocol useful in the present invention. In this embodiment, only memory 620 and third level cache 510 implement a directory protocol for maintaining coherency. As shown in FIG. 8, memory 620 has a memory directory 740 and third level cache 510 has a third level cache directory 750. In this embodiment of the present invention, second level cache 560 implements a "snoopy" protocol. Typically, snoopy protocols follow one of two approaches: write-invalidate or write-update (also referred to as write-broadcast). The embodiment of the present invention shown in FIG. 8 is a modified, exclusive, shared, invalid (MESI) protocol, or write-invalidate protocol.

Figure 9:
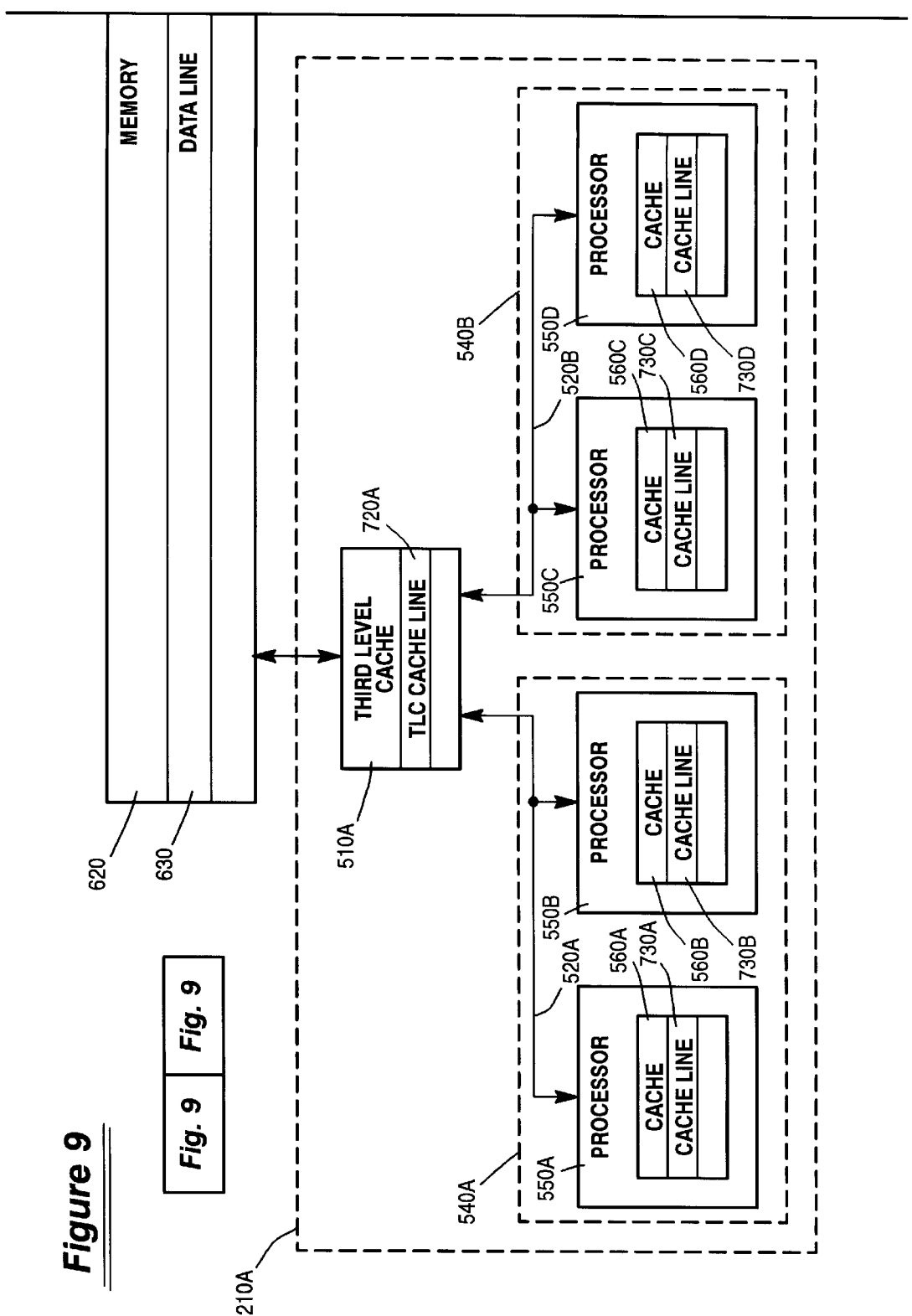
FIG. 9 illustrates a coherent system.

FIG. 9 illustrates a coherent system 900. Coherent system 900 includes two memories 620, two third level caches 510, and four processors 550. Memories 620 are connected to third level caches 510 via buses 945. Third level cache 510A is connected to processor 550A and processor 550B via bus 520A. Third level cache 510B is connected to processor 550C and processor 550D via bus 520B. Third level cache 510B is connected to processor 550E and processor 550F via bus 520C. Third level cache 510B is connected to processor 550G and processor 550H via bus 520D.

Memory 620 includes a plurality of data lines 620. Third level cache 510 includes one or more third level cache lines 720. Processors 550 may include one or more caches 560, such as the first level cache (not shown), a second level cache (not shown), etc. Each cache 560 includes one or more cache lines 730.

III. CACHING SCHEME

Caching schemes have been developed to reduce the time otherwise required by a processor to read data line 630 from memory 620. A cache, such as cache 560A, is used to store a copy of data line 630A at cache line 730A. Cache 560A is typically comprised of a small amount of memory located in close proximity to or within processor 550A. This allows processor 550A to quickly access cache lines 730A from cache 560A without the latency required by a read to data line 630A from memory 620A. When processor 550A reads a particular data line 630A, cache 560A is checked to determine whether a cache line 730A corresponding to the particular data line 630A exists in cache 560A. A "read-hit" occurs when corresponding cache line 730A is found in cache 560A. A "read-miss" occurs when corresponding cache line 730A is not found in cache 560A.

If processor 550A gets a read-hit, processor 550A reads cache line 730A from cache 560A. If processor 550A gets a read-miss, processor 550A must find the cache line in either another cache (e.g., another cache in processor 550A, third level cache 510A, etc.) or from memory 620A. In this case, once processor 550A gets its particular data line, whether from memory 630A or another cache, processor 550A stores the particular data line in cache 560A as cache line 730A. In this way, a subsequent read by processor 550A of the particular data line will achieve read-hits form cache 560A.

Other caches such as third level cache 510A, operate as additional caches between processor 550A and memory 620A to reduce the number of actual reads of a particular data line from memory 620A.

After checking its own internal caches for a copy of data line 630A, processor 550A determines whether any processor or third level cache 510 on bus 540A has a cache line 730 or 720 corresponding to data line 630A. This is accomplished according to techniques known as the MESI protocol. Processor 550A issues a request to bus 540A for a copy of data line 630A. Each processor 550 and third level cache 510 connected to bus 520A monitors bus 520A for such requests. Any processor 550 or third level cache 510 that has a cache line corresponding to data line 630A may respond to the request. The first processor 550 or third level cache 510 that responds to the request provides its cache line 730 or 720 to processor 550A.

If none of processors 550 or third level caches 510 respond to the request, processor 550A issues a request to third level cache 510 to determine whether a copy of data line 630 exists within any of its cache domains 540. Third level cache 510 again checks to determine whether a cache line 720 corresponding to data line 630 exists in third level cache 510. If cache line 720 exists and third level cache 510 is a data cache, third level cache 510 provides cache line 720 to processor 550A. If cache line 720 exists and third level cache 510 is a coherency cache, third level cache 510 issues a request for cache line 730 corresponding to data line 630 from processor 550 indicated in third level cache line 720. If third level cache line 720 does not exist in third level cache 510, third level cache 510 issues a request to bus 520B for data line 630. If any of processors 550 respond to the request by providing a cache line 730 corresponding to data line 630, third level cache 510 receives cache line 730 and provides it to processor 550A. In addition, third level cache 510 stores a copy of cache line 730 as cache line 720.

IV. MESSAGE PASSING

System platform 100 of the present invention can be thought of as including individual nodes which communicate with each other in order to implement the functionality of the architecture. That is, a node that contains processor 550 may communicate with a node that contains a memory, second level cache 560, third level cache 510, or MSU 110. Likewise, a node that contains an I/O device may communicate with a node that contains a processor. In actuality, every node is able to communicate with every other node. For example, processor 550 may send a message to MSU 110 through third level cache 510.

In order to facilitate communication among the components within system platform 100, the present invention utilizes a message passing scheme. That is, when two components within system platform 100 wish to communicate with each other, messages are passed between them.

A. Structure

Figure 10A:
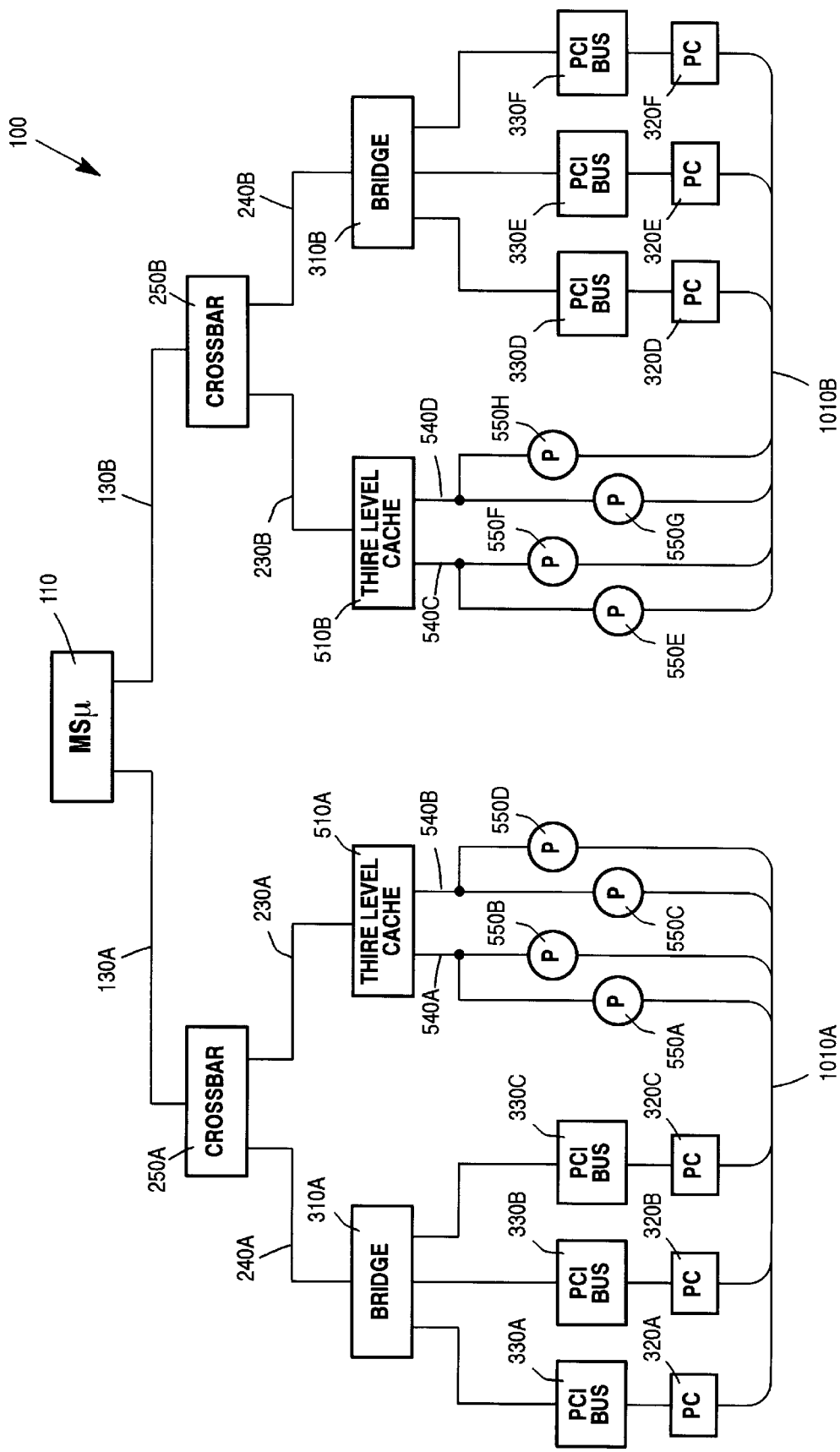
FIG. 10A and FIG. 10B illustrate a preferred embodiment of system platform suitable for implementation of the present invention.
Figure 10B:
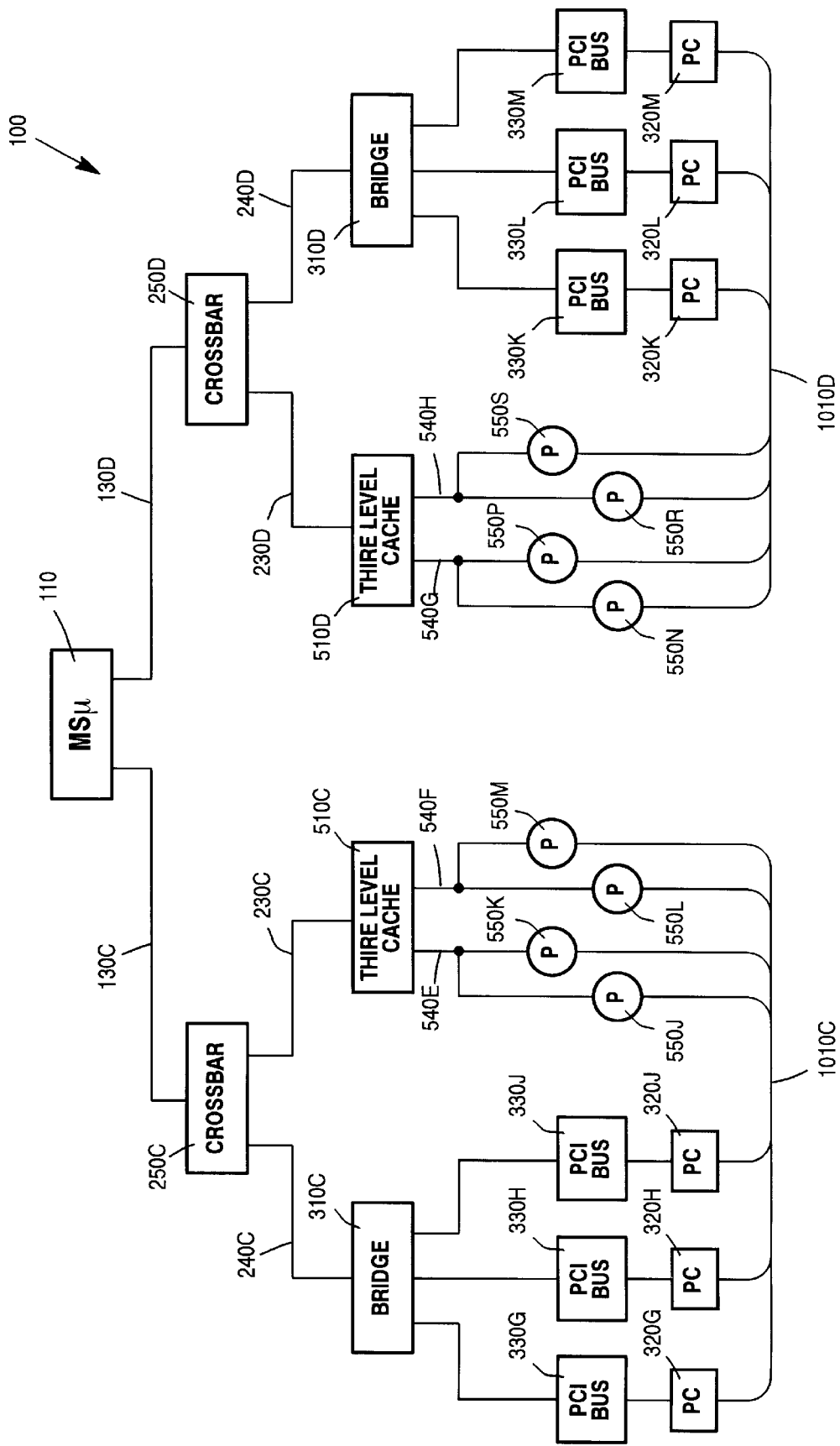

The message passing structure of a preferred embodiment of the present invention is described referring to FIGS. 10A, 10B, 11A, 11B, and 12. FIGS. 10A and 10B illustrate an implementation of a preferred embodiment of system platform 100. System platform 100 includes MSU 110, MI buses 130, crossbars 250, MT buses 230, MI/O buses 240, bridges 310, third level caches 510, processor buses 540, processors 550, PCI buses 330, peripheral component 320, and interrupt controller (IC) buses 1010. MI buses 130 interconnect MSU 110 with crossbars 250. MI/O buses 240 interconnect crossbars 250 with bridges 310. MT buses 230 interconnect crossbars 250 with third level caches 510. PCI buses 330 interconnect buses 310 with peripheral components 320. IC buses 1010 interconnect peripheral components 320 with processors 550, and processors 550 with each other.

Figure 11A:
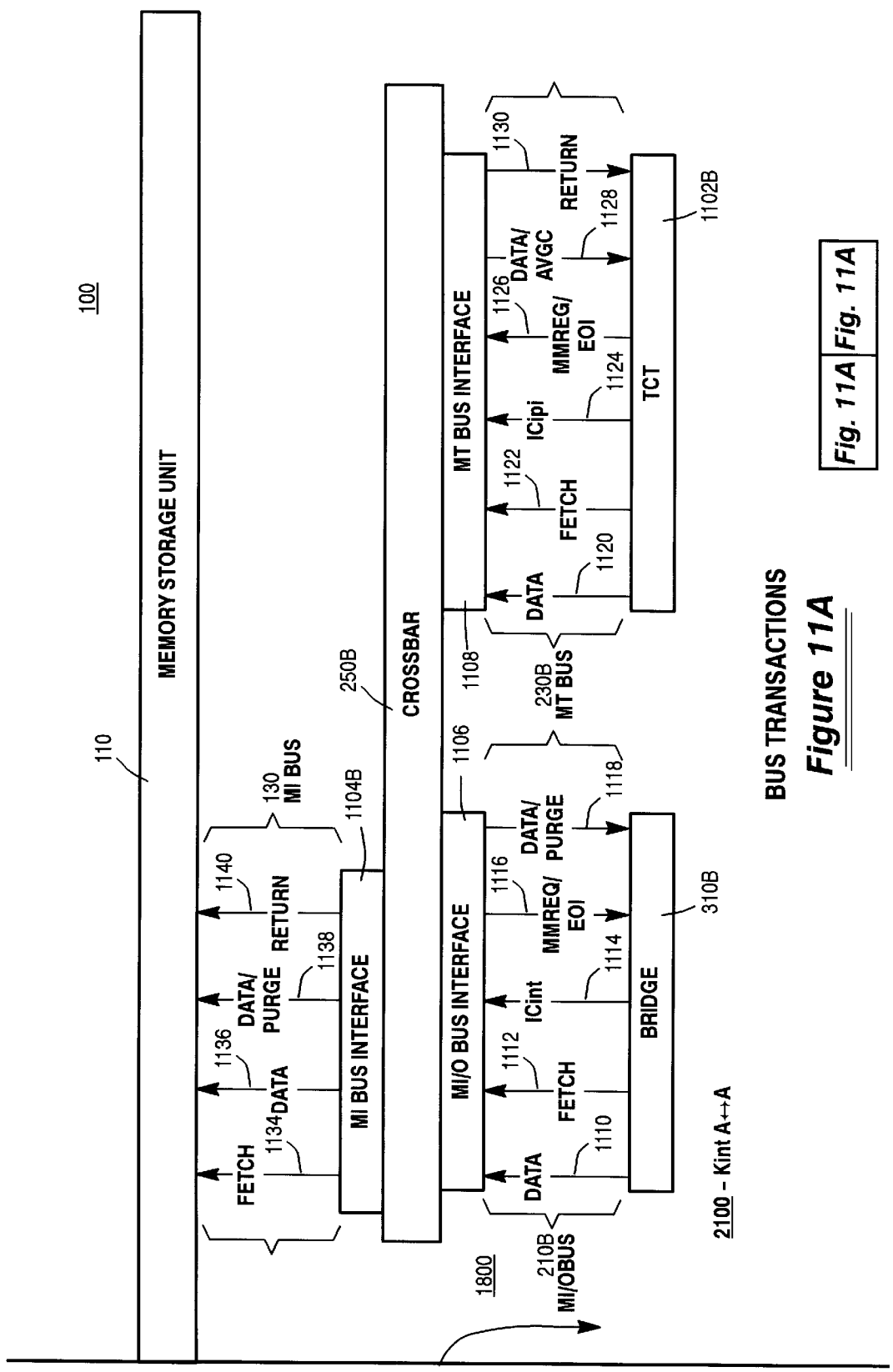
FIG. 11A illustrates message flow over MI bus 130.

FIG. 11A depicts message flow over MI bus 130. Transactions occur between MSU 110 and crossbar 250 via MI bus 130 and MI bus interface 1104, between crossbar 250 and bridge 310 via MI/O bus 240 via MI/O bus interface 1106, and between crossbar 250 and third level cache 510 (not shown) via MT bus 230 and third level cache interface (TCT) 1102.

Figure 11B:
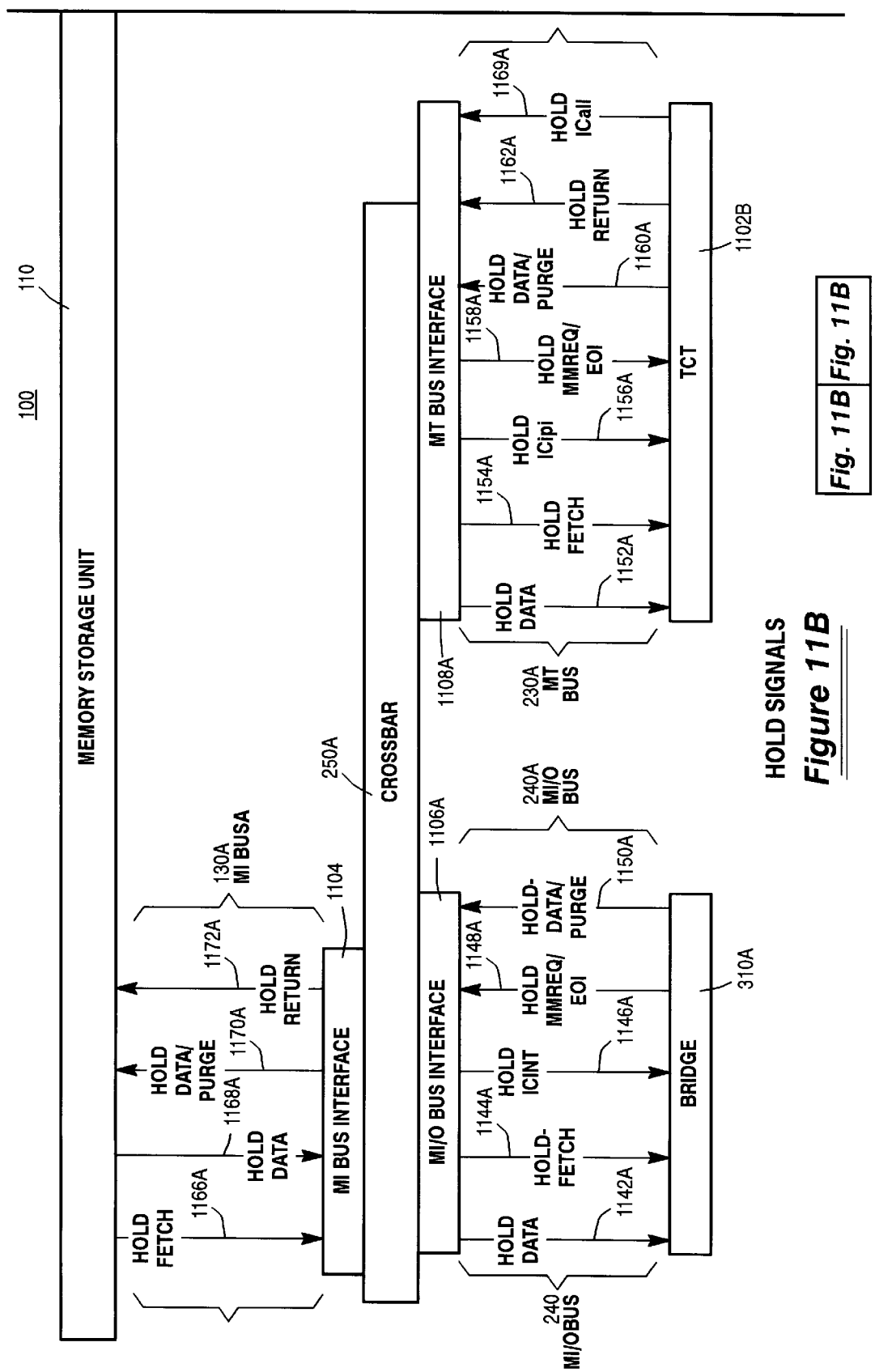
FIG. 11B illustrates the connectivity of HOLD signals.
Figure 11B:
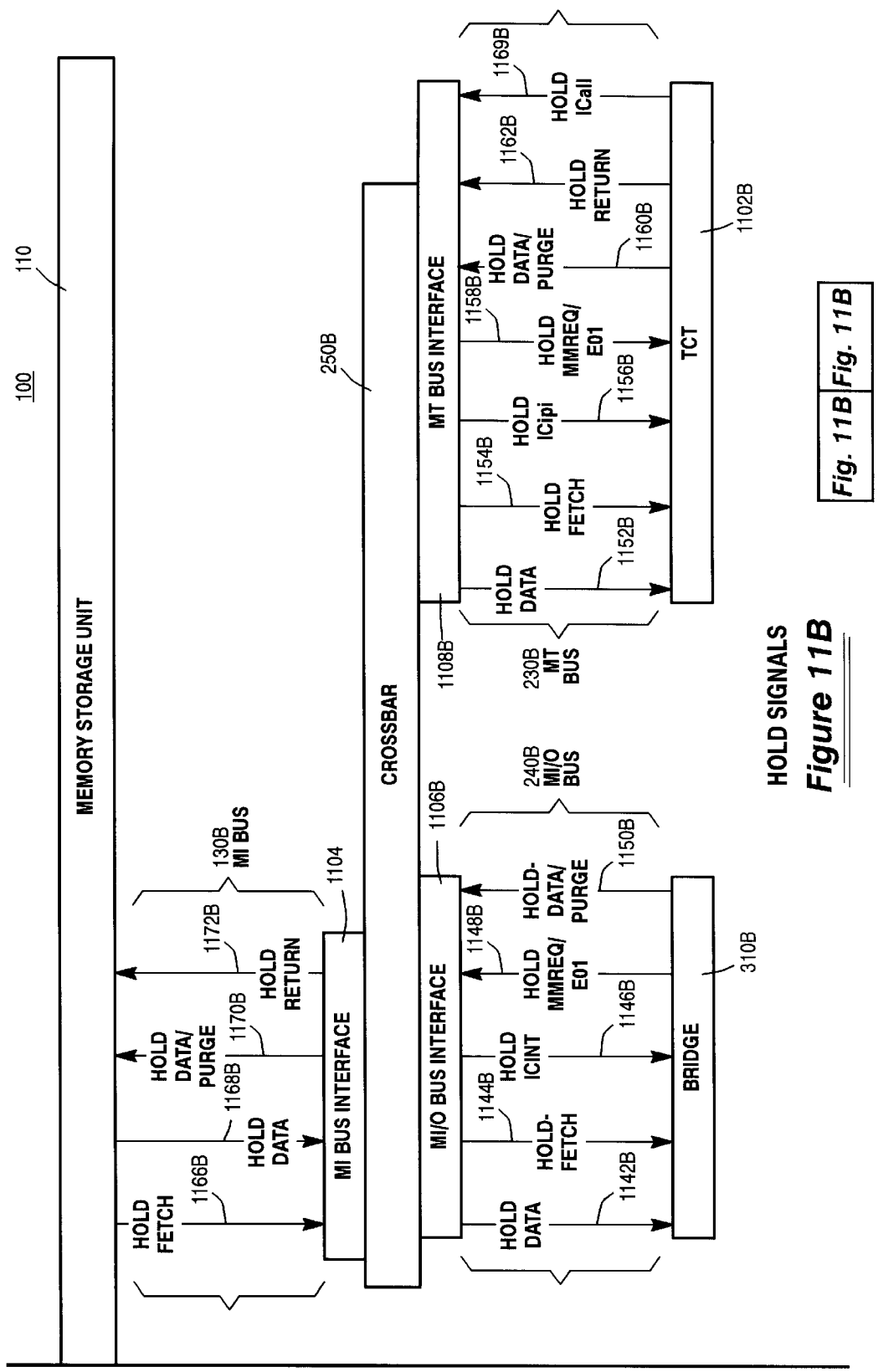

FIG. 11B depicts HOLD signals necessary to control message flow among MSU 110, MI bus 130, crossbar 250, bridge 310, TCT 1102, MI bus interface 1104, MI/O bus interface 1106, and MT bus interface 1108. All HOLD signals are synchronous to the bus clock for the bus interface the HOLD signals traverse. MI bus interface 1104, MI/O bus interface 1106, and MT bus interface 1108 are depicted as external, albeit coupled to crossbar 250. However, the bus interfaces may be an integral part of crossbar 250.

MI bus interface 1104 provides the connection between POD 120 and MSU 110. In a preferred embodiment, MI bus interface 1104 consists of unidirectional control lines, twenty-two bidirectional address and function lines, and eighty bidirectional data lines.

MI/O bus interface 1106 provides the interconnection between bridge 310 and crossbar 250. MI/O bus interface 1106 functions similar to MI bus interface 1104. In a preferred embodiment, MI/O bus interface 1106 accommodates seventy-six data and twenty address and function bidirectional signals between bridge 310 and crossbar 250. Additional signals provide for interface request control.

MT bus interface 1108 provides the interconnection between TCT 1102 and crossbar 250. In a preferred embodiment, MT bus interface 1108 consists of one hundred independent data associated bits and twenty-four address and function associated signals between MT bus interface 1108 and TCT 1102. These 124 bidirectional signals provide the path for data and address. Additional signals provide for interface request and response control.

B. Messages

A message is the logical unit of exchange between two components. A message may be any number of bytes in length. System platform 100 supports request messages, response messages, and return messages. Messages are transferred throughout system platform 100 using flow control mechanisms 1200, 1300, and 1400, crossbars 250, MI buses 130, MI/O buses 240, MT buses 230, MI bus interfaces 1104, MI/O bus interfaces 1106, and MT bus interfaces 1108. Message response and data fills are supplied by the message sender. Message responses and data fills are interpreted by the message receiver.

Request messages from PODs 120 to MSU 110 include requests by one POD, such as POD 120A, to fetch data from another POD, such as 120B. POD to memory request messages also include requests to "store," or transfer data and/or ownership from a POD 120 back to a MSU 110. POD to memory request messages include a request to send a message from one POD to another POD, such as from POD 120A to POD 120B. Request messages from MSU 110 to POD 120 include a request by MSU 110 that all PODs 120 purge (or invalidate) any copies of a particular cache line within POD 120. Request messages from MSU 110 to POD 120 include a request by MSU 110 that a POD 120 return (or release ownership of) a particular cache line, and to transfer the cache line back to MSU 110 if the cache line has been modified.

Fetch requests are messages that, in general, transfer data from MSU 110 to the POD 120. If the data is owned by another POD 120, then the fetch request instigates a return message to the particular POD 120 that owns the data. The return message is passed back to MSU 110 via a return message. The MSU 110 then routes the data to the requesting POD 120.

A fetch request message is typically a read request or a write request. A read request is a request by an agent for read ownership with respect to a particular data line. (Bridge 310 serves as a cache and memory agent for peripheral component 320. Third level cache 510 serves as a cache and memory agent for processor 550.) In other words, during a read request the agent is requesting a shared copy of a data line from another agent. According to a preferred embodiment of the present invention, for agents employing a directory based protocol, the agent requests read ownership from the next higher level agent. For agents employing a snoopy based protocol, the agent may request read ownership from the next higher level agent or from an equivalent level agent.

A write request is a request by an agent for write ownership with respect to a particular data line. That is the agent is requesting an exclusive copy of a data line from another agent. According to a preferred embodiment of the present invention, for agents employing a directory based protocol, the agent requests write ownership from the next high-level agent. For agents employing snoopy based protocol, the agent may request ownership from the next high-level agent or from a equivalent level agent.

A fetch request initiates a request to memory which normally (assuming no errors) results in the return or eight words of data. The requested address sent across MI/O bus 130 is the most significant thirty bit of a thirty-six byte address pointing to an even eight word boundary. The address is translated and a request is directed to the appropriate MSU 110.

A data purge request message is a request by an agent to a lower level agent for the lower level agent to remove or destroy a copy of a particular data line from its memory. A data purge is necessary when another agent is requesting write ownership with respect to a data line to ensure that it has the only valid copy of the data line. Practically, this is accomplished by marking a status of the copies of the data line as "not present" or "invalid." A data purge request message does not require a completion handshake (or return) from MSU 110. Example request messages are contained Table 1.

TABLE 1

Request Messages

| SIGNAL | COMMENTS |
| --- | --- |
| P_REQ | Unidirectional POD 120 to MSU 110 address request control signal. It starts a POD 120 to MSU request transaction. A request may be asserted in any clock cycle and is only one clock cycle in length. The address transfer is from a POD 120 to a MSU 110. This message is always asserted during the first cycle of the P_ADR_FNC message. |
| P_ADR_FNC | 21 bit bidirectional address/function message from a POD 120 to a MSU 110. This message takes two clock cycles. This is a time-multiplexed message that contains several fields and several formats depending on the field values and message direction. |
| M_ARB | Unidirectional MSU to POD 120 request to arbitrate message. |
| D_REQ | Unidirectional bridge 310 to POD 120 address request control signal. |
| D_ADR_FNC | 19 bidirectional address/function bits |
| P_ARB | Unidirectional POD 120 to bridge 310 request to arbitrate control signal. |
| S_REQ | Unidirectional MT bus 230 address request control signal. |
| S_ADR_FNC | 23 bidirectional address/function bits |
| PS ARB | Unidirectional MT bus 230 request to arbitrate control signal. |

A request, whether a fetch request, a data purge request, or a return request, consists of a two cycle address and function operation on 19 bidirectional bits. For example, the D_REQ signal is asserted from bridge 310 to crossbar 250 coincident with only the first cycle of a two cycle address function transfer, provided there are no holds. Holds are discussed in greater detail below. D_ADR_FNC contains the command to be executed and the address which is translated, the job number for transaction tracking, and other control information.

In order to start the message passing process, for example, bridge 310 raises D_REQ to crossbar 250, unless there are associated hold signals active. To initiate a purge to bridge 310, crossbar 250 asserts D__ARB, unless there are some associated hold signals active.

A response message functions to transfer data associated with a previous fetch request or memory map read request. Example response messages are contained Table 2.

TABLE 2

Response Messages

| SIGNAL | COMMENTS |
|---|---|
| M_RESPONSE | 7 bit unidirectional MSU 110 to POD 120 response vector; also indicates data transfer from MSU 110 to POD 120. |
| P_RESPONSE | 7 unidirectional POD 120 to bridge 310 response control signals. |
| PS_RESPONSE | 7 unidirectional MT bus 230 response control signals. |
| S_ARB | Unidirectional MT bus 230 arbitrate control signal. |

In a preferred embodiment, a response message consists of two cycles of information and has three formats. Format one supports fetches. Format two supports delayed purge acknowledged. Format two also supports failure and overwrite. Format three supports messages. For example, P_RESPONSE is sent to bridge 310 to respond to fetches and overwrites unless associated holds are active. P_RESPONSE also is sent to bridge 310 to indicate messages and delayed purge acknowledges unless associated holds are active.

A return request is a request by an agent for a lower level agent to return a copy of a particular data line for which the lower level agent has write ownership whether or not the data has been modified. This request is necessary when another agent desires write ownership with respect to the particular data line. A return requests makes sure that all changes to a particular data line are incorporated back to a higher level agent back before another agent subsequently modified data in the data line. In a preferred embodiment of the present invention, the changes to a particular data line are incorporated back to the agent whose cache domain includes both the agent relinquishing ownership of the data line and the agent requesting ownership of the data line. In some cases, the only agent to whom this applies is memory 620. In another embodiment of the present invention, the changes to data line 630 for example are incorporated back to memory 620 before write ownership is granted to any other agent.

A store message may be a return message. Stores are messages that transfer data and/or ownership from the POD 120 back to the MSU 110. There are three mechanisms that would trigger a store message. If third level cache 510 wants to age out a modified cache line and/or ownership, then TCT 1102 sends a store message to MSU 110. If a return message was issued to POD 120 from MSU 110, then POD 120 returns whatever was requested to be returned (typically a data or cache line). If I/O subsystem 220 has issued a fetch-original-no-coherency message, has received the data, and now wants to return ownership with data modified or not, then bridge 310 sends a return message.

Data may be transferred as a response or as a return. Data is sent using sixty-four bits of information in eight consecutive cycles to make up an eight word transfer. The eight words when transferred in ascending word address order. Data strobes are generated and sent across MI/O interface 1106 to support synchronous data transfers. Strobes are used to strobe the data at the destination synchronously thereby allowing double transferase. The bidirectional data bus functions to transfer fetch data, store data, and message information.

Other messages include memory-mapped I/O requests to read or write (or MMReq) messages, memory-mapped I/O response messages, I/O interrupt (or ICint) messages, interprocessor interrupt (or ICipi) messages, and end-of-interrupt (or EOI) messages. A memory-mapped response message flows inward toward MSU 110 across MI/O bus 230 from bridge 310 to crossbar 250. Likewise, ICint messages flow inward toward MSU 110 across MI/O bus 230 from bridge 310 to crossbar 250. Memory-mapped request messages and end-of-interrupt messages flow outward from MSU 110 across MI/O bus 230 from crossbar 250 to bridge 310. These two messages are called collectively memory-mapped request messages/end-of-interrupt (or MMReq/EOI) messages. MMReq messages and ICipi messages are eight words in length. That is, eight words are transferred across the various buses.

In all cases, messages are issued to MSUs 110 for routing to the destination POD 120, where crossbar 250 directs it to the appropriate destination bus. For example, referring to FIG. 10A, ICipi messages may originate in processor 550A and terminate in processor 550E. EOI messages originate in processor 550 and terminate in bridge 310. Likewise, MMReq messages originate in processor 550 and terminate in bridge 310. Memory-mapped response messages originate in bridge 310 and terminate in processor 550.

C. Hold Signals

Referring to FIG. 11B, a preferred embodiment of the present invention includes HOLD signals to control message flow withing system platform 100. MI/O bus 240 includes a HOLD data signal 1142, HOLD fetch signal 1144, a HOLD ICint signal 1146, a HOLD MMReq/EOI signal 1148, and a HOLD data/purge signal 1150. MI bus 130 includes a HOLD fetch signal 1166, a HOLD data signal 1168, a HOLD data purge signal 1170, and a HOLD return signal 1172. MT bus 230 includes a HOLD data signal 1152, a HOLD fetch signal 1154, a HOLD ICipi signal 1156, a HOLD MMReq/EOI signal 1158, a HOLD data/purge signal 1160, a HOLD return signal 1162, and a HOLD ICall signal 1164.

For example, the present invention includes HOLD Data signals. When a HOLD Data signal is asserted, the node to which the HOLD Data signal is asserted is prevented from sending data to the asserting node. When the HOLD Data signal is de-asserted (or inactive) the node to which the HOLD Data signal is asserted may send data to the asserting node. This functionality applies to HOLD Data signals 1142, 1152, and 1168.

In particular, HOLD data signal 1142 is asserted by crossbar 250 to bridge 310. HOLD data signal 1142 instructs bridge 310 not to issue any more data of any type until HOLD data signal 1142 signal is de-asserted by crossbar 250. Therefore, all store request messages, memory-mapped read response messages, and interrupt messages are held at bridge 310 until crossbar 250 de-asserts HOLD data signal 1142.

Similarly, HOLD data signal 1152 is asserted by crossbar 250 to TCT 1102. HOLD data signal 1152 instructs TCT 1102 not to issue any more store request messages, memory-mapped request messages, or interrupt messages to MT bus 230 until HOLD data signal 1152 is de-asserted. When HOLD data signal 1152 is asserted, crossbar 250 cannot accept data of any kind. TCT 1102 utilizes HOLD data signal 1142 to maintain message ordering.

Likewise, HOLD data signal 1168 is asserted by MSU 110 to MI bus interface 1104. HOLD data signal 1168 instructs crossbar 250 not to issue any more store request messages, memory-mapped request messages, or interrupt messages to MI bus 130 until HOLD data signal 1168 is de-asserted.

The present invention also includes HOLD Fetch signals. When a HOLD Fetch signal is asserted, the node to which the HOLD Fetch signal is asserted is prevented from sending memory fetch requests to the asserting node. When the HOLD Fetch signal is de-asserted the node to which the HOLD Fetch signal is asserted may send data to the asserting node. This functionality applies to HOLD Fetch signals 1144, 1154, and 1166.

In particular, HOLE) fetch signal 1144 is asserted by crossbar 250 to bridge 310. HOLD fetch signal 1144 instructs bridge 310 not to issue any more memory fetch requests until HOLD fetch signal 1144 signal is de-asserted. This is because crossbar 250's memory request queue has reached the "HOLD" points and is becoming full, due either to a rapid influx of memory requests or as a result of the MSU 110 asserting it's HOLD Fetch signal 1166. In either case, crossbar 250 can no longer accept fetch requests from MI/O bus 240.

Similarly, HOLD fetch signal 1154 is asserted by crossbar 250 to TCT 1102. HOLD fetch signal 1154 instructs TCT 1102 not to issue any more MSU 110 fetch request messages until HOLD fetch signal 1154 is de-asserted by crossbar 250.

Likewise, HOLD fetch signal 1166 is asserted by MSU 110 to crossbar 250. HOLD fetch signal 1166 instructs crossbar 250 not to issue any more MSU 110 fetch request messages until HOLD fetch signal 1166 is de-asserted by MSU 110.

The present invention also includes HOLD Data/Purge signals. When a HOLD Data/Purge signal is asserted, the node to which the HOLD Data/Purge signal is asserted is prevented from sending either data or purge messages to the asserting node. When the HOLD Data/Purge signal is de-asserted the node to which the HOLD Data/Purge signal is asserted may send data and purge messages to the asserting node. This functionality applies to HOLD Data/Purge signals 1150, 1160, and 1170.

For example, HOLD data/purge signal 1150 is asserted by bridge 310 to crossbar 250. Assertion of HOLD data/purge signal 1150 instructs crossbar 250 not to allow fetch data response messages, purge request messages, memory-mapped request messages, and IC EOI messages to be sent across MI/O bus 240 until bridge 310 has de-asserted HOLD data/purge signal 1150. Essentially, HOLD data/purge signal 1150 informs crossbar 250 that bridge 310 cannot accept data of any kind. Because purges must remain ordered with fetched data, HOLD data/purge signal 1150 signal enforces this ordering by halting both data and purges at crossbar 250. Crossbar 250 thus maintains ordering between requests and responses destined for MI/O bus 240.

Similarly, HOLD data/purge signal 1160 is asserted by TCT 1102 to crossbar 250. HOLD data/purge signal 1160 directs crossbar 250 not to issue any more purge request messages, fetch response messages, memory-mapped response messages, or interrupt messages to MT bus 230 until HOLD data/purge signal 1160 is de-asserted. In essence, HOLD data/purge signal 1160 informs crossbar 250 that TCT 1102 cannot accept data of any kind. HOLD data/purge signal 1160 enforces ordering of purges and fetched data by halting both data and purges at crossbar 250.

Likewise, HOLD data/purge signal 1170 is asserted by crossbar 250 to MSU 110. HOLD data/purge signal 1170 directs MSU 110 not to issue any more purge request messages, fetch response messages, memory-mapped response messages, or interrupt messages to MI bus 130 until HOLD data/purge signal 1170 is de-asserted.

The present invention also includes HOLD MMReq/EOI signals. When a HOLD MMReq/EOI signal is asserted, the node to which the HOLD MMReq/EOI signal is asserted is prevented from sending memory-mapped read, memory-mapped write, or end-of-interrupt messages to the asserting node. When the HOLD MMReq/EOI signal is de-asserted the node to which the HOLD MMReq/EOI signal is asserted may send memory-mapped read, memory-mapped write, or end-of-interrupt messages to the asserting node. This functionality applies to HOLD MMReq/EOI signals 1148 and 1158.

For example, HOLD MMReq/EOI signal 1148 is asserted by bridge 310 to crossbar 250. HOLD MMReq/EOI signal 1148 instructs crossbar 250 not to issue any more memory-mapped read or write requests. It also indicates not to send any end-of-interrupt messages to MI/O bus 240. When HOLD MMReq/EOI signal 1148 is asserted, AMReq and EOI messages are held in the sequence received until MMReq/EOI signal 1148 is de-asserted by bridge 310.

Similarly, HOLD MMReq/EOI signal 1158 is asserted by crossbar 250 to TCT 1102. HOLD MMReq/EOI signal 1158 instructs TCT 1102 not to issue any more memory-mapped requests or EOI (MMReq/EOI) messages. That is, IC EOI messages are held by this signal.

The present invention also includes HOLD Return signals. When a HOLD Return signal is asserted, the node to which the HOLD Return signal is asserted is prevented from sending request messages to the asserting node. When the HOLD Return signal is de-asserted the node to which the HOLD Return signal is asserted may send request messages to the asserting node. This functionality applies to HOLD Return signals 1162 and 1172.

For example, HOLD return signal 1162 is asserted by TCT 1102 to crossbar 250. HOLD return signal 1162 instructs crossbar 250 not to issue any more return request messages. HOLD return signal 1172 is asserted by crossbar 250 to MSU 110. HOLD return signal 1172 instructs MSU 110 not to issue any more return request messages.

The present invention also includes HOLD ICint, HOLD ICipi, and HOLD ICall signals. When these HOLD ICxx signals are asserted, the node to which the HOLD ICxx signal is asserted is prevented from sending interrupt messages to the asserting node. When the HOLD ICxx signal is de-asserted the node to which the HOLD ICxx signal is asserted may send interrupt messages to the asserting node. This functionality applies to HOLD ICint signal 1146, HOLD ICipi signal 1156, and HOLD ICall signal 1164.

For example, HOLD ICint signal 1146 halts interrupt controller interrupt messages. HOLD ICint signal 1146 is asserted by crossbar 250 to bridge 310. HOLD ICint signal 1146 directs bridge 310 not to issue any more interrupt messages until HOLD ICint signal 1146 is de-asserted. HOLD ICipi signal 1156 halts inter-processor interrupt messages. HOLD ICipi signal 1156 is asserted by crossbar 250 to TCT 1102. HOLD ICipi signal 1156 instructs TCT 1102 not to issue any more inter-processor interrupt (ICipi) messages until HOLD ICipi signal 1156 is de-asserted. End-of-interrupt (EOI) messages are not held by the HOLD ICipi signal. HOLD ICall signal 1164 halts both interrupt controller interrupt messages and inter-processor interrupt messages. HOLD ICall signal 1164 is asserted by TCT 1102 to crossbar 250. HOLD ICall signal 1164 directs crossbar 250 not to issue any more ICipi and ICint messages until HOLD ICall signal 1164 is de-asserted by TCT 1102. Assertion of HOLD ICall signal 1164 results from TCT 1102's interrupt queue logic having a backlog of interrupt messages to be delivered.

D. Message Flow Control for Minimizing Congestion

The flow control process of the present invention controls the flow of messages between the components in system platform 100. The flow control mechanism utilizes feedback in order to notify the sending component of when it is allowed to send another message. Feedback in the form of message acknowledge signals is rapidly sent back to the sending component over dedicated lines, causing all links between the sending component and the receiving component to be frozen until the receiving component can make room for the next message.

Messages are divided into packets, with each packet including the destination of the packet plus a portion of the message. Message acknowledge signals allow the receiving component to give the sending component the right to send a predetermined number of packets before getting permission to send more packets. A design tradeoff of utilizing packet switching is that system platform 100 has a fixed amount of bandwidth to which both small and large amounts of message traffic has access. As a consequence, large amounts of message traffic may create congestion in system platform 100.

Message flow congestion is minimized by preventing new messages from entering system platform 100 until message traffic is reduced. The present invention accomplishes this by using a message flow control in the form of HOLD signals to control the flow of messages throughout system platform 100. An advantage of the HOLD signals is that queuing structures utilized to buffer in-flight messages are smaller. All HOLD signals are synchronous to the bus clock for the interface the signals traverse.

In a preferred embodiment of the present invention, the message flow control mechanism includes a software interface protocol to MSU 110 and hardware acknowledge lines directly between crossbar 250. For example, the protocol comprises MSU 110 giving a message response back to the sender of every message that MSU 110 receives. This allows the sending crossbar 250 to keep track of and to limit the number of outstanding messages to a given MSU 110.

1. Message Flow Across MI Bus 130

Figure 12:
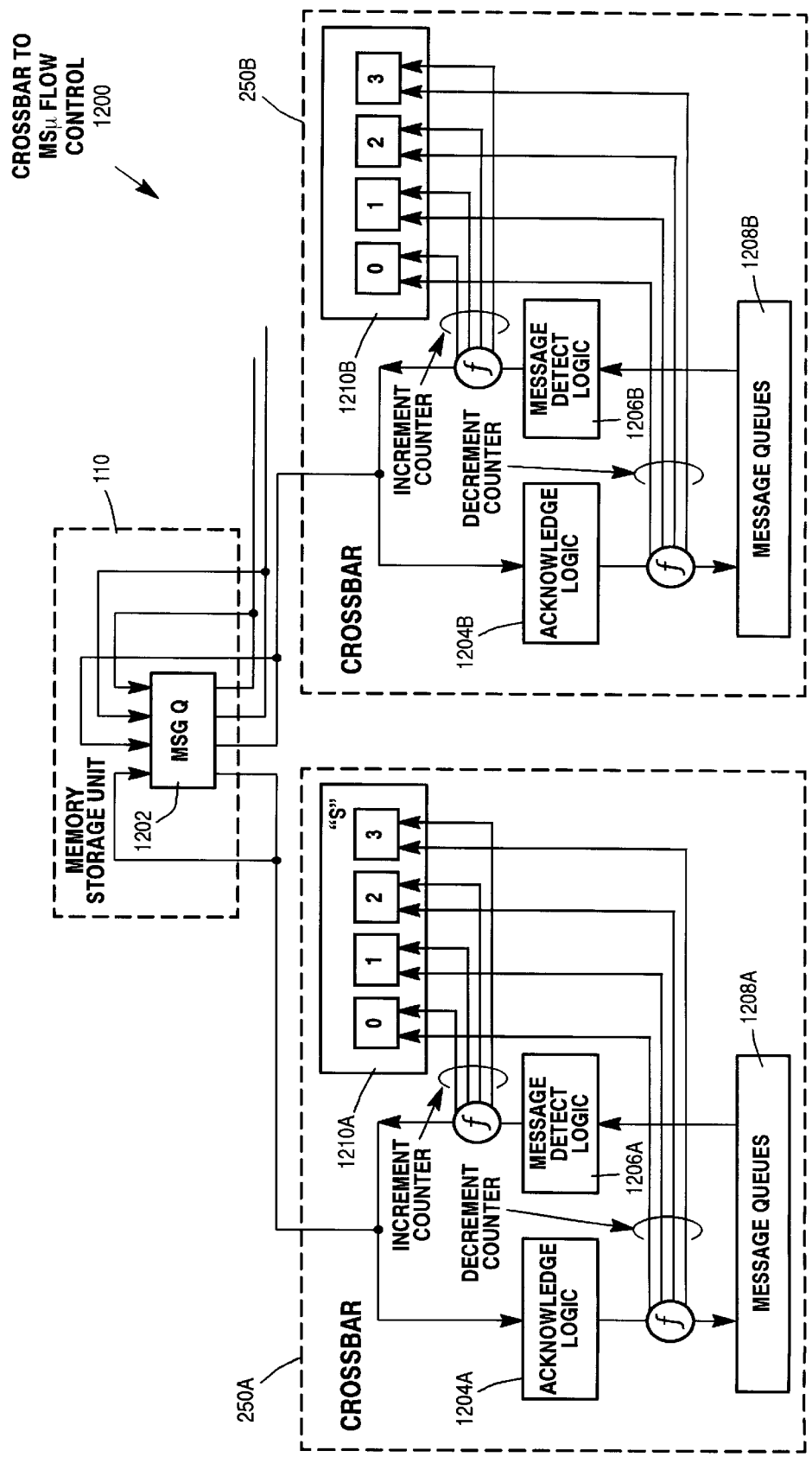
FIG. 12 is a more detailed view of a flow control mechanism for controlling the flow of messages between a crossbar and a memory storage unit.

FIG. 12 is a more detailed view of a flow control mechanism 1200 for controlling the flow of messages between crossbar 250 and MSU 110. MSU 110 includes a message queue 1202. In a preferred embodiment, each message queue 1202 can accept and hold four messages from any one MI bus interface 1104 at a time. Flow control mechanism 1200 includes a block of message acknowledge logic 1204, a block of message detect logic 1206, a set of MSU message queues 1208, and an outstanding message counter set 1210. Each outstanding message counter set 1210 is responsible for ensuring the outstanding message limit is observed. Outstanding message counter 1210 keeps track of messages sent from crossbar 250 to a particular MSU 110 but which have not been sent to the next crossbar 250. Counter set 1210 includes a set of four counters, one for each MSU 110. More counters may be added as the number of MSUs is increased.

Typically, messages are queued as necessary in the sending node, in transit, and in the receiving node. Accordingly, they have arbitrary delay from sender to receiver. However, message order is preserved between pairs of components. To ensure correct delivery ordering between messages, all messages destined for a specific POD must be delivered through the same MSU 110. Flow control mechanism 1200 implements the soft interface protocol to MSU 110.

Flow control mechanism 1200 controls the message flow between crossbar 250 and MSU 110. A message handed off to MSU 110 by crossbar 250 is guaranteed to be delivered to the receiving crossbar 250 by MSU 110. Each MSU message queue 1202 can accept and hold a predetermined number of messages. In a preferred embodiment, message queue 1202 can accept and hold four messages from any one flow control mechanism 1200 at a time. Each outstanding message counter 1210 is responsible for ensuring the outstanding message limit is observed.

Outstanding message counter 1210 keeps track of in-flight messages from crossbar 250 to a particular MSU 110. In a preferred embodiment, outstanding message counter 1210 includes a set of four counters, one for each MSU 110. That is, outstanding message counter 1210 reflects the number of in-flight messages to a particular MSU 110 from a particular crossbar 250.

Incorporated with outstanding message counter 1210 is a memory acknowledge message issued by MSU 110 back to the message source crossbar 250 acknowledging message delivery to the destination crossbar 250. The source crossbar 250 uses this message to decrement it's outstanding message counter 1210.

Figure 16A:
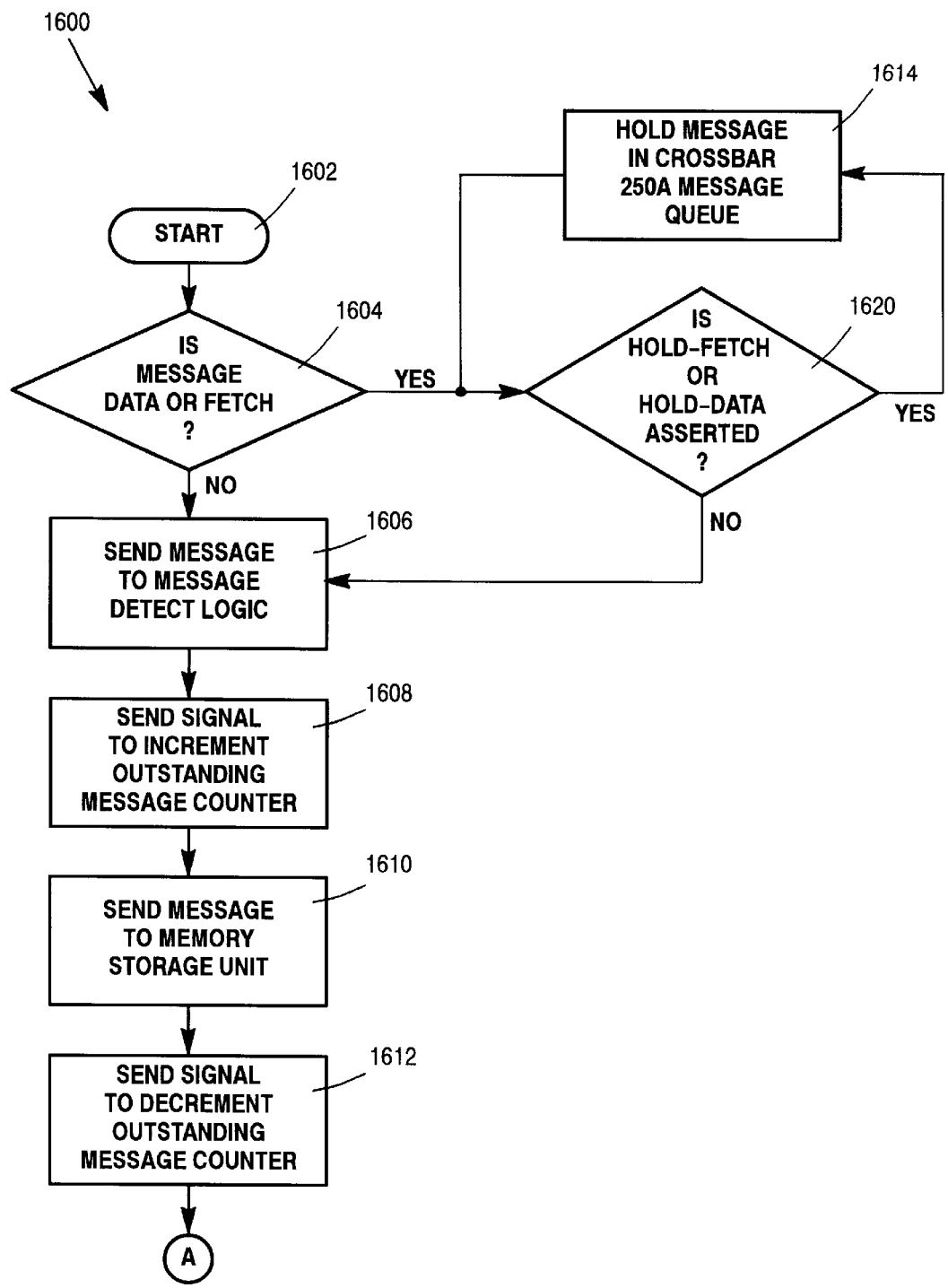
FIG. 16A and FIG. 16B depict a flowchart representing the operation of a flow control mechanism that controls the flow of messages across a memory storage unit interface bus.
Figure 16B:
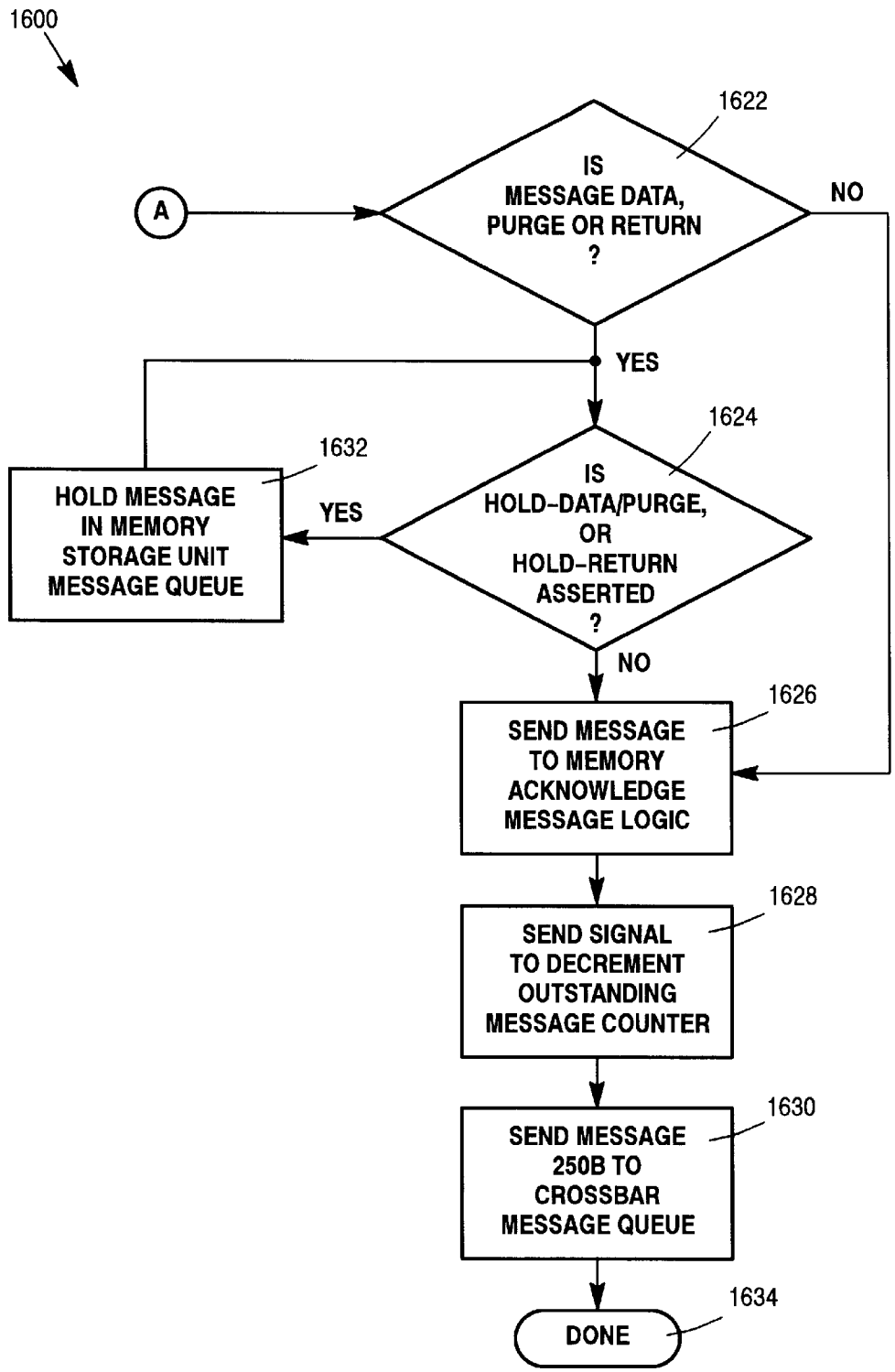

FIG. 16A and FIG. 16B illustrate a flowchart 1600 of the operation of crossbar to MSU to crossbar flow control mechanism 1200. Flowchart 1600 begins with step 1602, where control immediately passes to step 1604.

In step 1604, crossbar 250A looks in crossbar message queue 1208A to determine whether the message to be sent is a data message or a fetch message. If the message to be sent is not a data message or a fetch message control of flowchart 1600 passes to step 1606.

In step 1606, crossbar message queue 1208A sends a message to message detect logic 1206A. In step 1608, message detect logic 1206A sends the signal to increment outstanding message counter 1204A. In step 1610, message detect logic 1206A sends the message to MSU 110. The message is stored in MSU message queue 1202 until it may be delivered to the next stop along the route to its destination.

In step 1612, MSU message queue 1202 sends a signal to decrement outstanding message counter 1204A. After outstanding message counter 1204A is decremented, control of flowchart 1600 passes to step 1622.

In step 1622, MSU message queue 1202 determines whether the message to be sent is a data message, a purge message, or a return message. If the message to be sent is not a data message, a purge message, or a return message, the control of flowchart 1600 passes to step 1626.

In step 1626, MSU message queue sends the message to memory acknowledge message logic 1206B. In step 1628 memory acknowledge message logic 1206B sends a signal to outstanding message counter 1204B. The signal increments outstanding message counter 1204B. In step 1630, memory acknowledge message logic 1206B sends the message to crossbar 250B message queue 1208B. The operation of flowchart 1600 is complete, as indicated in step 1634.

If as determined in step 1604, the message to be sent is a data message or a fetch message, then control of flowchart 1600 passes to step 1620. In step 1620, crossbar message queue 1208A determines whether there is a HOLD fetch signal 1134 or a HOLD data signal 1136 asserted. If there is a HOLD fetch signal 1134 or a HOLD data signal 1136 asserted, the control of flowchart 1600 passes to step 1614. Otherwise, control passes to step 1606.

In step 1614, crossbar message queue 1208A holds the data message or the fetch message in crossbar message queue 1208. Operation of flowchart 1600 continues cycling between step 1620 and step 1614 until it is determined in step 1620 that HOLD fetch signal 1134 or HOLD data signal 1136 has been de-asserted. When HOLD fetch signal 1134 or HOLD data signal 1136 has been de-asserted, control of flowchart 1600 passes to step 1606, and operation of flowchart 1600 continues as described above.

If in step 1622, message is determined to be a data message, a purge message, or a return message, control of flowchart 1600 passes to step 1624.

In step 1624, MSU message queues 1202 determines whether a HOLD data/purge signal 1138 is asserted or whether a HOLD return signal 1140 is asserted. If it is determined that a HOLD data/purge signal 1138 is asserted or a HOLD return signal 1140 is asserted, then control of flowchart 1600 passes to step 1632. Otherwise, control passes to step 1626.

In step 1632, MSU message queue 1202 holds the data, purge, or return message in MSU message queue 1202. Operation of flowchart 1600 continues to cycle between step 1624 and step 1632 until it is determined that the HOLD data/purge signal 1138 or the HOLD return signal 1140 has been de-asserted. When the HOLD data/purge signal 1138 has been de-asserted or the HOLD return signal 1140 has been de-asserted, control of flowchart 1600 passes to step 1626, and operation of flowchart 1600 continues as described above.

2. Deadlock

Utilizing the above described message flow control mechanism, deadlock may occur under two scenarios. First, if PCI bus 330A has committed to a fetch request, PCI bus 330A stalls in anticipation of the data delivery from MSU 110. If bridge 310A's MI/O bus input message queues are full, bridge 310A asserts HOLD data/purge signal 1150 and HOLD MMReq/EOI signal 1148 on the MI/O bus 240. As a result, crossbar 250A begins to hold messages, as well as the associated data, in its buffers. If the fetched data is held in a crossbar 250A buffer behind MMReq/EOI and other messages, a deadlock condition will occur.

The second scenario in which utilizing the above described message flow control mechanism may cause deadlock arises when TCT 1102A's MT bus input message queues are full and TCT 1102A asserts HOLD ICall signal 1169 on MT bus 230.

For example, suppose processor 550 has to perform a memory-mapped read in order to complete an interrupt. TCT 1102 asserts HOLD ICall signal 1169 on MT bus 230, causing interrupt messages along with their data packets to back up into crossbar 250. That is, the returning read data will become blocked behind the held interrupt message data in crossbar 250 data queues. Before processor 550 can accept an interrupt delivery (of data, for example). Processor 550 is not able to complete the interrupt unless the returning read data is delivered to processor 550. This also means that processor 550 is not able to remove the interrupt from it's interrupt in-service register. TCT 1102's interrupt message delivery mechanism will retry the interrupt message delivery until the retry counter expires and the new interrupt is retired to the interrupt error log as an undeliverable interrupt.

V. MESSAGE FLOW PROTOCOL FOR AVOIDING DEADLOCKS

The present invention avoids deadlocks using several flow control mechanisms to control message flow within system platform 100. For example, flow control mechanism 1300 controls the flow of messages between crossbars. Flow control mechanism 1400 also controls the flow of messages between crossbars. The flow control mechanisms avoid deadlocks by maintaining proper message order.

A. Structure

Figure 13:
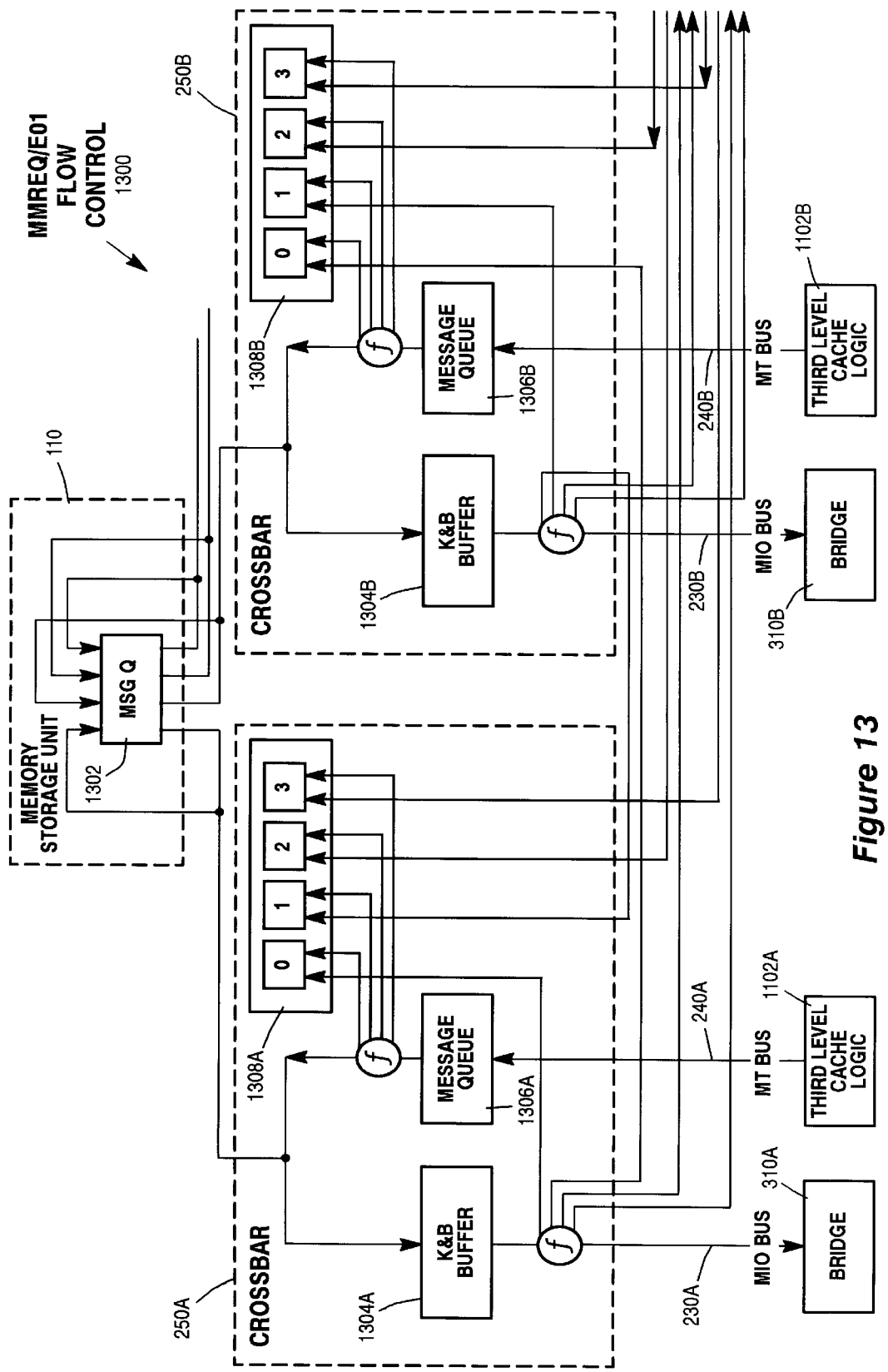
FIG. 13 is a more detailed view of a flow control mechanism for controlling the flow of memory-mapped request messages and end-of-interrupt messages in the system platform of the present invention.

FIG. 13 is a more detailed view of a flow control mechanism 1300 for controlling the flow of memory-mapped request messages and end-of-interrupt messages. Flow control mechanism 1300 includes MSU 110, crossbar 250, bridge 310, third level cache logic 1102 (or TCT 1102), MI/O bus 230, MT bus 240. MSU 110 includes a message queue 1302. Crossbar 250 includes a kick-aside buffer set 1304, message queue 1306, and MMReq/EOI counter set 1308. Each counter within MMReq/EOI counter set 1308 keeps track of how many outstanding MMReq and EOI messages, destined for MI/O bus 240 that source crossbar 250 has issued to each destination crossbar 250.

MMReq/EOI flow control mechanism 1300 controls the message flow between bridge 310, crossbar 250, and TCT 1102. As described above, memory-mapped request messages and end-of-interrupt (or MMReq/EOI) messages flow outward from MSU 110 across MI/O bus 230 from crossbar 250 to bridge 310. That is, EOI messages originate in processor 550 and terminate in bridge 310 and MMReq messages originate in processor 550 and terminate in bridge 310. MMReq/EOI counter 1308. Each counter within MMReq/EOI counter 1308 keeps track of how many outstanding MMReq and EOI messages, destined for MI/O bus 240, that source crossbar 250 has issued to each destination crossbar 250.

MMReq/EOI counter 1308 works with a set of MMReq/EOI message acknowledge signals to control decrementing of MMReq/EOI counter 1308. Each MMReq/EOI message acknowledge signal runs from the destination crossbar 250 back to the source crossbar 250. There is one MMReq/EOI message acknowledge signal from each destination crossbar 250 to each source crossbar 250 in system platform 100. In a preferred embodiment, there are twelve external and four internal MMReq/EOI message acknowledge signals in all. There are four internal MMReq/EOI message acknowledge signals (or one per crossbar 250) because each source crossbar 250 may also be the destination crossbar 250 for the same MMReq/EOI message acknowledge signal.

Figure 14:
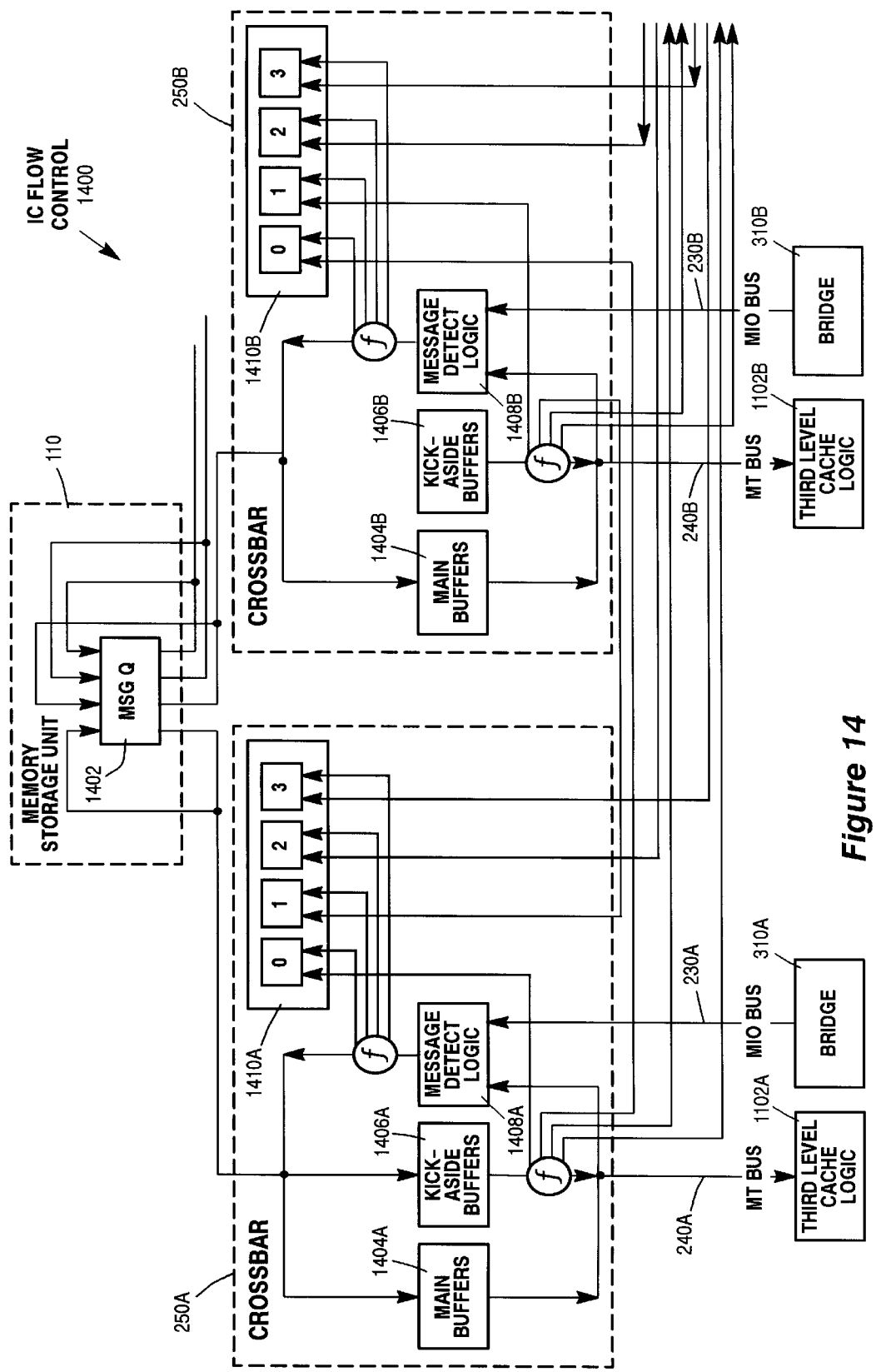
FIG. 14 is a more detailed view of a flow control mechanism for controlling the flow of interrupt messages in the system platform of the present invention.

FIG. 14 is a more detailed view of a flow control mechanism 1400 for controlling the flow of interrupt messages. Flow control mechanism 1400 includes MSU 110, crossbar 250A, crossbar 250B, MT bus 240, MI/O bus 230, third level cache 1110, and bridge 310. MSU 110 includes a message queue 1402. Crossbar 250 includes a set of memory buffers 1404, a set of kick-aside buffers 1406, and message detect logic 1408. Crossbar 250 also includes an ICint/ICipi counter set 1410.

Each counter in ICint/ICipi counter set 1410 keeps track of how many outstanding I/O interrupt (ICint) and Inter-Processor Interrupt (ICipi) messages, destined for MI/O bus 240 that source crossbar 250 has issued to each destination crossbar 250. ICint/ICipi kick-aside buffer set 1406 is linked to ICint/ICipi counter set 1410 and to ICint/ICipi message acknowledge signals.

ICint/ICipi counter set 1410 also works with a set of message acknowledge signals to control decrementing of ICint/ICipi counter set 1410. Each ICint/ICipi message acknowledge signal runs from the destination crossbar 250 back to the source crossbar 250. There is one ICint/ICipi message acknowledge signal from each destination crossbar 250 to each source crossbar 250 in system platform 100.

In a preferred embodiment, each kick-aside buffer has four message locations per POD 120. There are four kickaside buffers in each crossbar 250. MMReq/EOI kick-aside buffer set 1304 is the set of kick-aside buffers associated with each MI/O bus 240. ICint/ICipi kick-aside buffer set 1406 is the set of kick-aside buffers associated with each MT bus 230.

Figure 15:
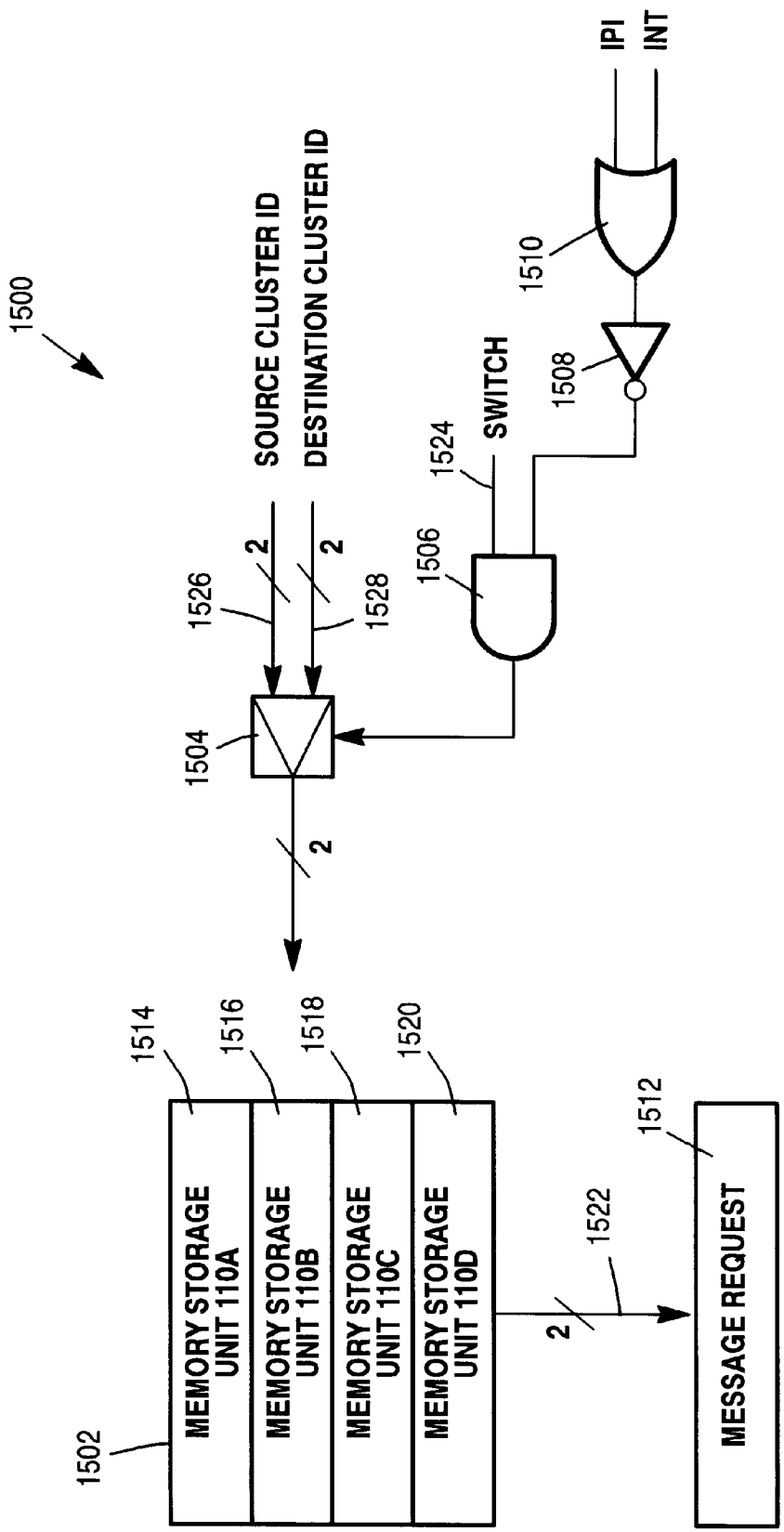
FIG. 15 depicts a message delivery memory storage unit selection mechanism.

Both TCT 1102 and bridge 310 contain a message delivery MSU selection mechanism 1500, as depicted in FIG. 15. Message delivery memory storage selection mechanism 1500 includes a lookup table 1502, a selector 1504, a gate 1506, an inverter 1508, a gate 1510, and a bus message request bit store 1512.

Lookup table 1502 includes an entry 1514 for MSU 110A, an entry 1516 for MSU 110B, an entry 1518 for MSU 110C, and an entry 1520 for MSU 110D.

Sending a message between components requires that the sending component have a reference to the receiving component. References are represented in messages as IDs. Lookup table 1502 holds the MSU ID that must be used in a message request. Lookup table 1502 provides a two bit field 1522 required of the MT bus message request cycle 1. Lookup table 1502 also provides a two bit field (not shown, but similar to two bit line 1522) of the MI/O bus message request cycle 2. The source/destination POD ID switch setting 1524 is set at system initialization time. The chosen MSU 110 depends on the selectable source POD ID 1526 or the destination POD ID 1528 of the message.

B. Deadlock Avoidance Message Flow Across MI/O Bus 230

The present invention thus provides "out of the memory flow" buffering to hold the incoming messages that are associated with a particular HOLD condition. The kick-aside buffers provide the additional buffering.

In a preferred embodiment, there are four kick-aside buffers in a crossbar 250. There is one kick-aside buffer set associated to each MI/O bus 240 and each MT bus 230. Each kick-aside buffer has four message locations per POD 120.

MMReq/EOI kick-aside buffer set 1304 is associated with MI/O bus 240 are the. MMReq/EOI kick-aside buffer set 1304 is linked to MMReq/EOI counter 1308 and to MMReq/EOI message acknowledge signals. In a preferred embodiment, MMReq/EOI kick-aside buffer 1304 includes a queuing structure pair. A first queue holds the MMReq/EOI message and a second queue holds this message's associated data packet.

ICint/ICipi kick-aside buffer set 1406 is associated with MT bus 230. ICint/ICipi kick-aside buffer set 1406 is linked to ICint/ICipi counter set 1410 and to ICint/ICipi message acknowledge signals.

C. Deadlock Avoidance Message Flow From TCT 1102A to Bridge 310A

As described above, data flows across MI/O bus 240 from bridge 310 to crossbar 250 toward MSU 110. Once outgoing response data has been received by crossbar 250 from MI/O bus 240, crossbar 250 forwards the data to MSU 110. If crossbar 250 cannot accept any data, it will assert the HOLD Data signal 1142 on MI/O bus 240. The assertion of HOLD Data signal 1142 by crossbar 250 will cause bridge 310 to stop sending more data until HOLD Data signal 1142 is de-asserted by crossbar 250.

MMReq/EOI messages flow across MI/O bus 240 from crossbar 250 to bridge 310. Bridge 310 has two flow control signals for controlling outbound memory-mapped request messages and EOI messages (collectively called HOLD MMReq/EOI signal 1146). When bridge 310 receives an EOI message, it internally scans a redirection table (not shown, but similar to lookup table 1502 and whose logic is structured to provide an indication of which PCI bus 330 an interrupt is associated with) in preparation to reset the interrupt associated with the particular EOI message. Bridge 310 also notes which PCI bus 330 generated the interrupt. Bridge 310 selects particular PCI bus 330 entry from the redirection table and posts it for later clearing of an interrupt-in-service bit. Bridge 310 then forces all pending requests on MMReq/EOI signal 1116 queued for the particular PCI bus 330 to be flushed before returning to clear the interrupt in-service bit. This reduces the risk of spurious interrupts from being generated. This is necessary because the incoming EOI message is processed after the MMReq message. Either of these messages could be informing bridge 310 to de-asserts its interrupt line.

Figure 17:
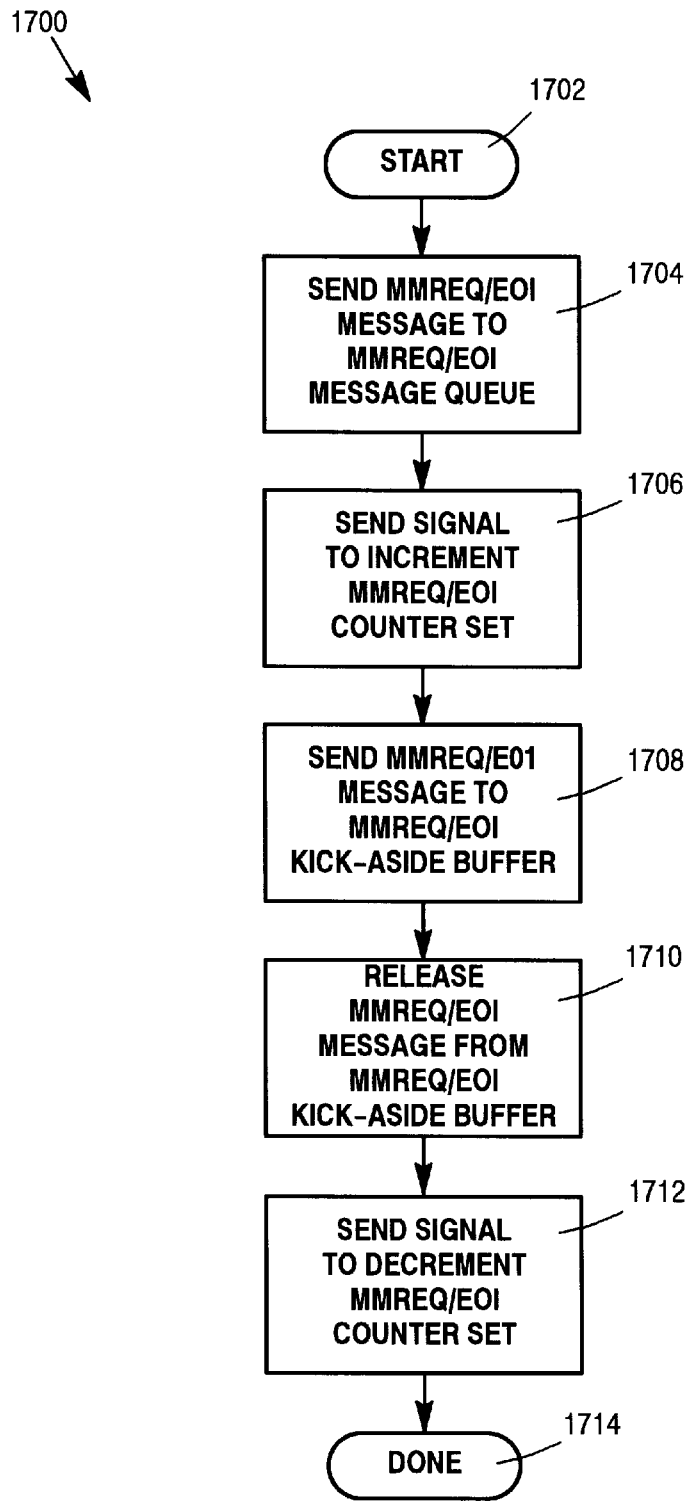
FIG. 17 is a flowchart representing the operation of the message flow of a memory-mapped request messages and end-of-interrupt messages within a crossbar from third level cache logic to a bridge.

FIG. 17 is a flowchart 1700 of operation of message flow of a MMReq/EOI message within crossbar 250A from TCT 1102A to bridge 310A. Flowchart 1700 begins with step 1702, where control immediately passes to step 1704.

In step 1704, TCT 1102A sends MMReq/EOI message to MMReq/EOI message queue 1306A. In step 1706, MMReq/EOI message queue 1306A sends a signal to increment MMReq/EOI counter 1308A. In step 1708, MMReq/EOI message queue 1306A sends a MMReq/EOI message to MMReq/EOI kickaside buffer 1304A. In step 1710, MMReq/EOI kickaside buffer 1304A releases MMReq/EOI message from MMReq/EOI kickaside buffer 1304A.

In step 1712, MMReq/EOI kickaside buffer 1304A sends a signal to decrement MMReq/EOI counter 1308A. At this point, the MMReq/EOI message arrives at bridge 310A.

When MMReq/EOI message arrives at bridge 310A, operation of flowchart 1700 is complete, as indicated in step 1714.

D. Deadlock Avoidance Message Flow From TCT 1102A to Bridge 310B

Figure 18:
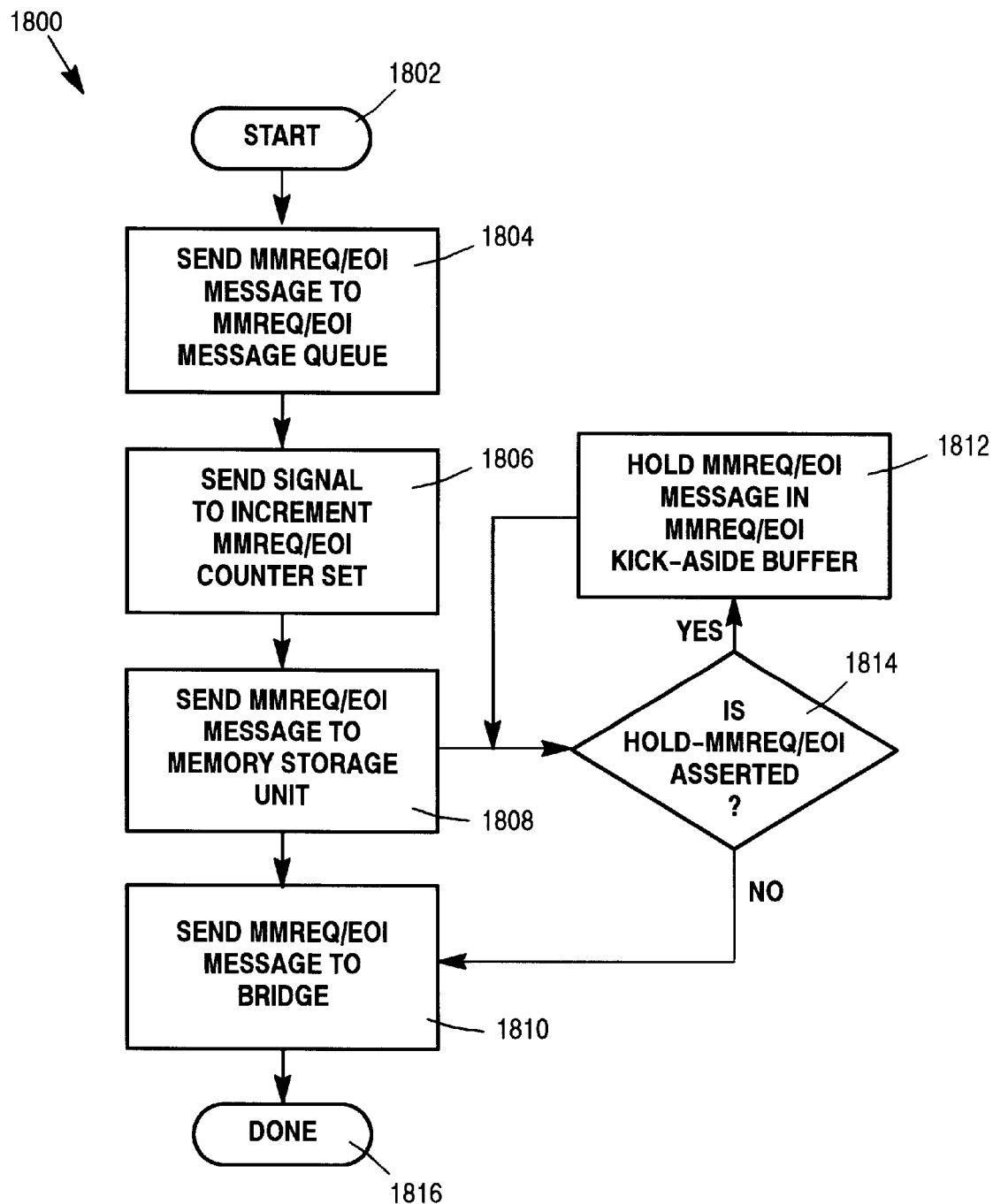
FIG. 18 is a flowchart representing the operation of a memory-mapped request messages and end-of-interrupt messages flow control mechanism passing messages from third level cache logic to a bridge.

FIG. 18 is a flowchart 1800 of the operation of MMReq/EOI flow control mechanism 1300 passing messages from third level cache 1102A to bridge 310B. Flowchart 1800 begins with step 1802, where control immediately passes to step 1804.

In step 1804, TCT 1102A sends MMReq/EOI message to MMReq/EOI message queue 1306 across MT bus 230A. In step 1806, MMReq/EOI message queue 1306A sends a signal to increment MMReq/EOI counter 1308A. In step 1808, MMReq/EOI message queue 1306 sends MMReq/EOI message to MSU 110. In step 1814, MSU 110 determines whether HOLD MMReq/EOI signal 1148 is asserted. If HOLD MMReq/EOI signal 1148 is asserted then operation of flowchart 1800 passes to step 1812.

In step 1812, MSU 110 holds MMReq/EOI message in MSU 110 message queue 1302. Operation of flowchart 1800 continues to cycle between step 1814 and 1812 until HOLD MMReq/EOI signal 1148 is de-asserted. When HOLD MMReq/EOI signal 1148 is de-asserted, operation of flowchart 1800 passes to step 1810.

In step 1810 MSU 110 sends MMReq/EOI message to MMReq/EOI kickaside buffer 1304B across MI bus 130B.

In step 1811 MMReq/EOI kickaside buffer 1304B sends MMReq/EOI message to bridge 310B across MI/O bus 240A.

After bridge 310 receives MMReq/EOI message from MMReq/EOI kickaside buffer 1304B operation of flowchart 1800 is complete, as indicated by step 1816.

As described above, ICint messages flow inward toward MSU 110 across MI/O bus 230 from bridge 310 to crossbar 250.

Each counter in ICint/ICipi counter set 1410 keeps track of how many outstanding I/O interrupt (ICint) and Inter-Processor Interrupt (ICipi) messages, destined for MI/O bus 240, that source crossbar 250 has issued to each destination crossbar 250.

ICint/ICipi counter set 1410 also works with a set of message acknowledge signals to control decrementing of ICint/ICipi counter set 1410. Each ICint/ICipi message acknowledge signal runs from the destination crossbar 250 back to the source crossbar 250. There is one ICint/ICipi message acknowledge signal from each destination crossbar 250 to each source crossbar 250 in system platform 100.

E. Deadlock Avoidance Message Flow From TCT 1102A to TCT 1102B

Figure 19:
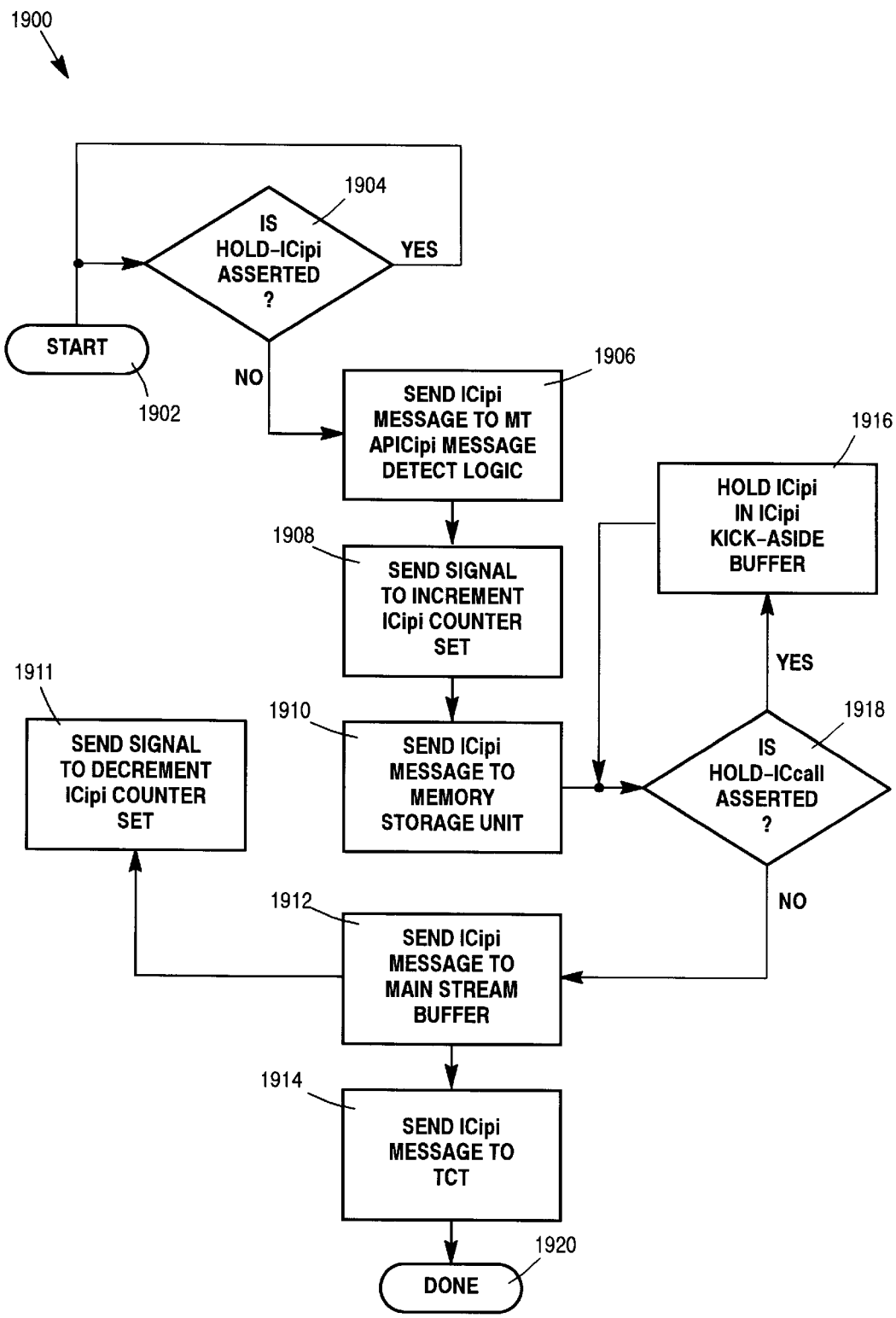
FIG. 19 is a flowchart representing the operation of an interrupt flow control mechanism of the present invention.

FIG. 19 is a flowchart 1900 of the operation of interrupt message flow control mechanism 1400 of the present invention. Flowchart 1900 represents the flow of ICipi messages from TCT 1102A to TCT 1102B. Flowchart 1900 begins with step 1902 where control immediately passes to step 1904.

In step 1904, TCT 1102A determines whether HOLD ICipi signal 1156 is asserted. If there is no HOLD ICipi signal 1156 asserted control passes to step 1906. In step 1906, TCT 1102 sends ICipi message to MT ICipi to message detect logic 1404A. In step 1908, MT ICipi message detect logic at 1408A sends that signal to increment ICipi counter 1404A. In step 1910, MT ICipi message detect logic 1408 sends ICipi message to MSU 110.

In step 1911, MT ICipi message detect logic 1408 sends a signal to decrement IC counter 1404A.

In step 1918, MSU 110 determines whether HOLD ICall signal is asserted. If HOLD ICall signal 1164 is not asserted, control of flowchart 1900 passes to step 1912.

In step 1912, MSU sends ICipi message to mainstream buffers 1404B. In step 1914, memory stream buffers 1404B send ICipi message to TCT 1102B. After ICipi message has been sent to 1102B, operation of flowchart 1900 is complete, as indicated by step 1920.

If in step 1904 it is determined that a HOLD ICipi signal 1156 has been asserted, flowchart 1900 repeats step 1904 until it has been determined that HOLD ICipi signal 1156 has been de-asserted. When HOLD ICipi signal 1156 has been de-asserted control of flowchart 1900 passes to step 1906, and operation of flowchart 1900 continues as described above.

If in step 1918 it is determined that HOLD ICall signal 1164 has been asserted control of flowchart 1900 passes to step 1916. In step 1916, ICipi message is held in ICipi kickaside buffer set 1406B. Operation of flowchart 1900 continues to cycle between step 1916 and 1918 until it is determined If in step 1918 that HOLD ICall signal 1164 has been de-asserted. When HOLD ICall signal 1164 has been de-asserted, control of flowchart 1900 passes to step 1912, where operation of flowchart 1900 continues as described above.

F. Deadlock Avoidance Message Flow From Bridge 310A to TCT 1102A

Figure 20:
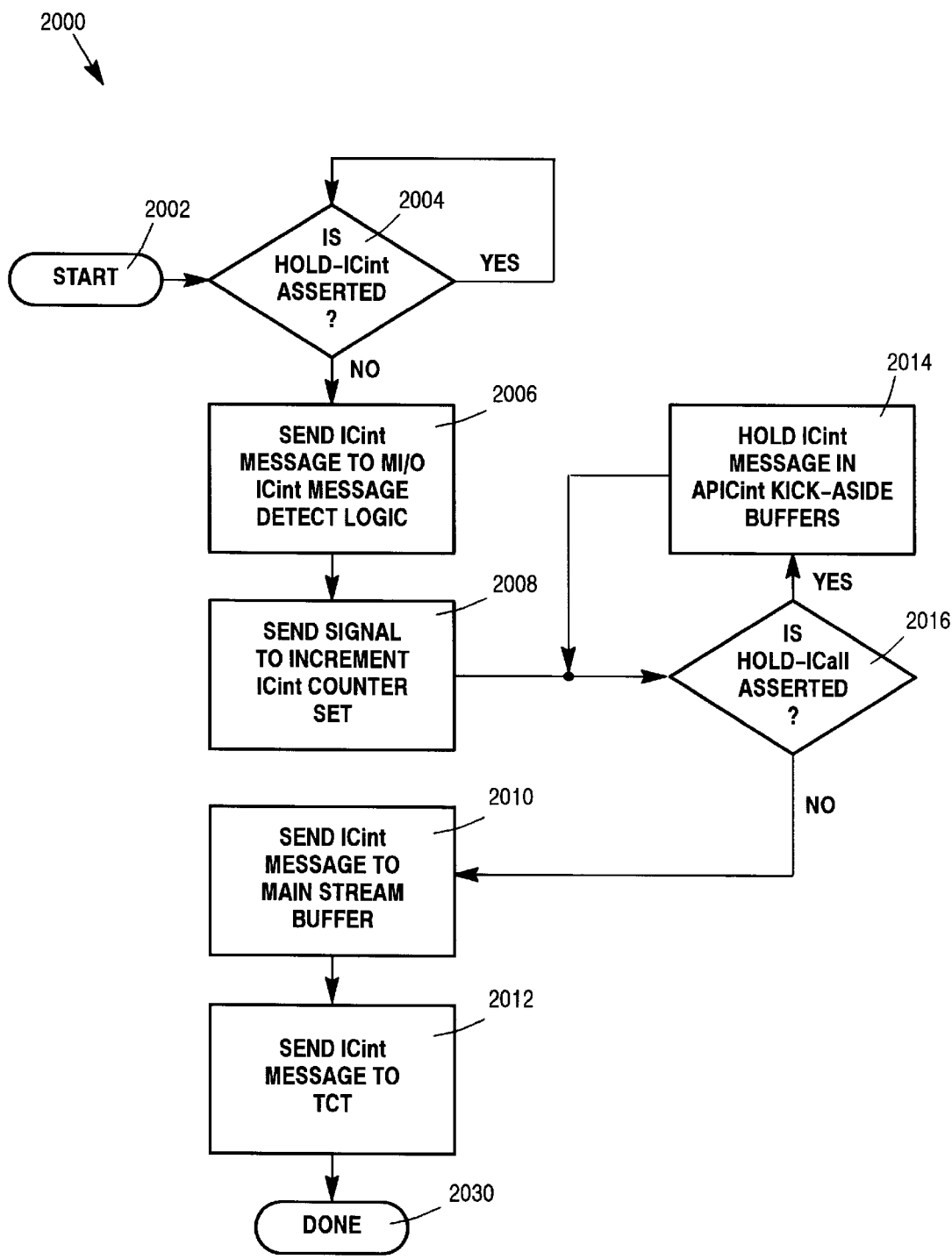
FIG. 20 is a flowchart representing the operation an interrupt flow control mechanism as ICint messages are passed from a bridge to third level cache logic.

FIG. 20 is a flowchart 2000 of the interrupt message flow control mechanism 1400 as ICint messages passed from bridge 310A to TCT 1102A. Flowchart 2000 begins with step 2002, where control immediately passes to step 2004.

In step 2004, bridge 310A determines whether HOLD ICint signal is asserted. If HOLD ICint signal is asserted flowchart 2000 continues to perform step 2004 until HOLD ICint signal is de-asserted. When HOLD ICint signal has been de-asserted, control of flowchart 2000 passes to step 2006.

If in step 2006, bridge 310 sends ICint message to MI/O ICint message detect logic detect logic 1408A. If in step 2008, MI/O ICint message detect logic 1408A sends a signal to increment ICint counter set 1410A.

In step 2016, ICint message detect logic 1408 determines if HOLD ICall has been asserted. If HOLD ICall signal has not been asserted control of flowchart 2000 passes to step 2010, If in step 2010, MI/O ICint message detect logic 1408A sends ICint message to mainstream buffers 1404A, as shown in step 2010. In step 2012, mainstream buffers 1404A send ICint message to TCT 1102A. After ICint message has been received by TCT 1102A, operation of flowchart 2000 is complete, as indicated by step 2030.

If, in step 2016, HOLD ICall signal 1164 has been asserted, control of flowchart 2000 passes to step 2014. In step 2014, ICint kickaside buffer set 1406A holds ICint message. ICint message is held in ICint kickaside buffer set 1406A, and operation of flowchart 2000 continues to cycle between steps 2014 to 2016 until it is determined hi step 2016 that HOLD ICall signal 1164 has been de-asserted. When HOLD ICall signal 1164 has been de-asserted, control of flowchart 2000 passes to step 2010, and operation of flowchart 2000 continues as described above.

G. Deadlock Avoidance Message Flow From Bridge 310A to TCT 1102B

Figure 21:
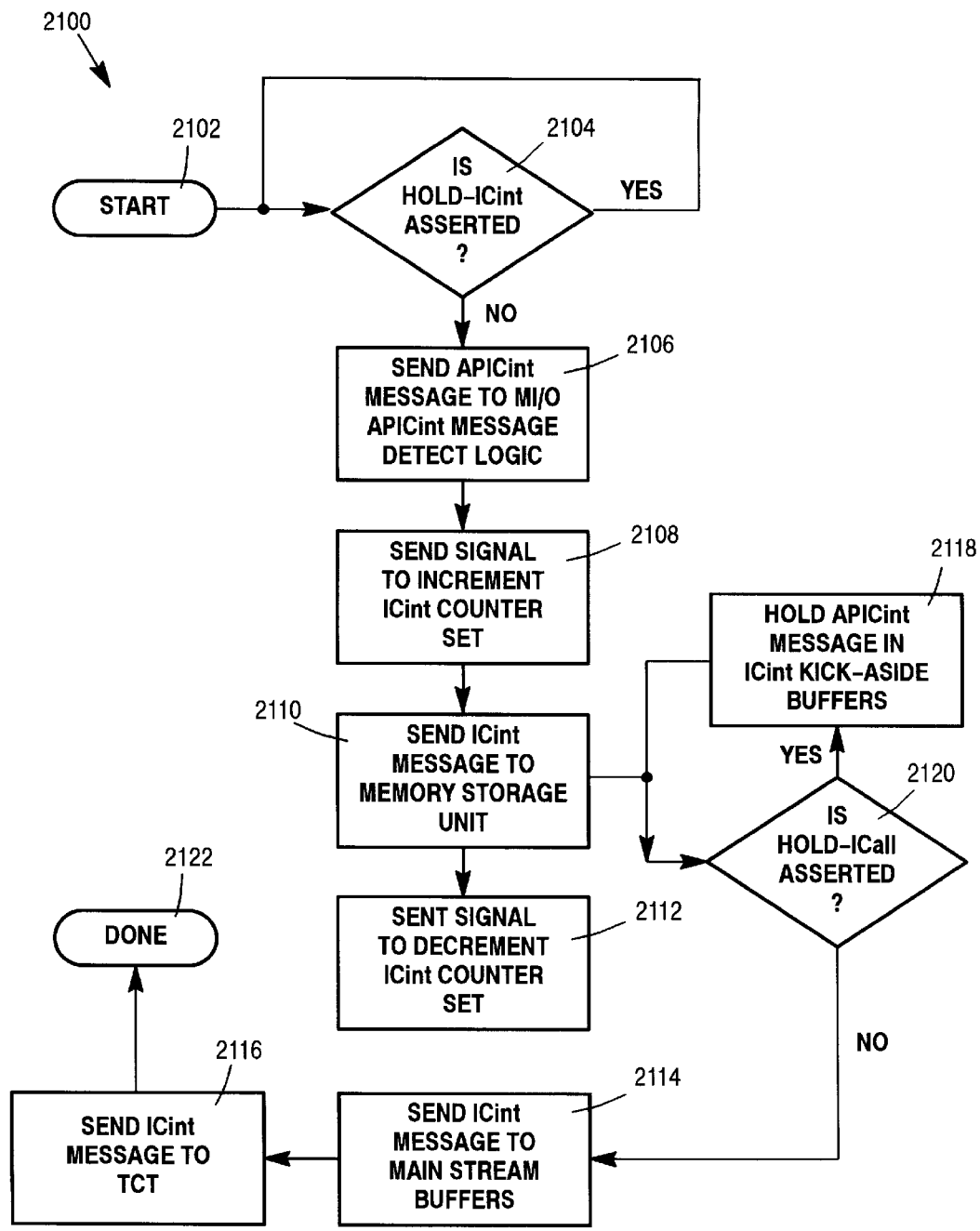
FIG. 21 is a flowchart representing the operation of an interrupt flow control mechanism when passing ICint messages from a bridge to third level cache logic.

FIG. 21 is a flowchart 2100 of the interrupt message flow control mechanism 1400 when passing ICint messages from bridge 310A to TCT 1102B. Flowchart 2100 begins with step 2102, where control immediately passes to step 2104.

In step 2104, bridge 310A determines whether HOLD ICint signal is asserted. If HOLD ICint signal 1146 is asserted, flowchart 2100 continues to perform step 2104 until HOLD ICint signal 1146 is de-asserted. When HOLD ICint signal has been de-asserted, control of flowchart 2100 passes to step 2106.

In step 2106, bridge 310A sends ICint message to MI/O ICint message detect logic 1408A.

In step 2108, MI/O ICint message detect logic 1408A sends a signal to increment ICint counter set 1410A. In step 2110, MI/O ICint message detect logic 1408A sends ICint message to MSU 110.

In step 2120, MSU 110 determines whether HOLD ICall signal is asserted. If HOLD ICall signal 1164 is not asserted, then control of flowchart 2100 passes to step 2114. Instep 2114, MSU 110 sends ICint message to mainstream buffers 1404B. In step 2116, mainstream buffers 1404B send ICint message to TCT 1402B. After TCT 1102B receives ICint message, operation of flowchart 2100 is complete, as indicated in step 2122.

If in step 2120 it is determined that HOLD ICall signal is asserted, control of flowchart 2100 passes to step 2118. If in step 2118, ICint message is held in ICint kickaside buffer set 1406B. Operation of flowchart 2100 continues to cycle between step 2118 and step 2120 until it is determined in step 2120 that HOLD ICall signal 1164 has been de-asserted. When HOLD ICall signal 1i164 has been de-asserted, control of flowchart 2100 passes to step 2114, where operation of flowchart 2100 continues as described above.

VI. CONCLUSION

While the invention has been particularly shown and described with reference to preferred embodiments thereof, it will be understood by those skilled in the art that various changes in form and details may be made therein without departing from the spirit aid scope of the invention.

What is claimed is:

1. A method, in a communications network of a computer system, the computer system having a memory storage unit coupled to a plurality of crossbar switches, each one of the plurality of crossbar switches being coupled to at least one third level cache, wherein the memory storage unit, the plurality of crossbar switches, and the third level caches are interconnected via the communications network of the computer system, for controlling congestion when sending data between the third level caches and the memory storage unit, the method comprising the steps of:

(1) determining that a message is a data message comprising one of a fetch request or a data transfer;

(2) determining that a means for preventing the flow of data messages from a first crossbar switch to a memory storage units is inactive;

(3) sending the data message to said memory storage unit;

(4) determining that said message in said memory storage unit is one of a data transfer, a purge request, or a return request;

(5) determining that a means for preventing the flow of one of a data transfer, a purge request, or a return request from said memory storage unit to a second crossbar switch is inactive; and (6) sending said data message from said memory storage unit to a third level cache via the second crossbar switch.

2. The method of claim 1, further comprising a step performed before step (1) of (a) sending said message from the third level cache to first crossbar switch.

3. The method of claim 1, wherein step (3) further comprises a step of (b) detecting said message.

4. The method of claim 1, wherein step (3) further comprises a step of (c) incrementing a first outstanding message counter, wherein said first outstanding message counter is associated with the first crossbar switch.

5. The method of claim 4, wherein step (3) further comprises a step of (d) decrementing said first outstanding message counter.

6. The method of claim 1, wherein step (5) further comprises a step of (e) acknowledging receipt of said message by said first crossbar switch.

7. The method of claim 1, wherein step (5) further comprises a step of (f) incrementing a second outstanding message counter, wherein said second outstanding message counter is associated with said second crossbar switch.

8. A method, in a communications network of a computer system, the computer system having a memory storage unit coupled to a plurality of crossbar switches, the crossbar switches being coupled to a plurality of third level caches, wherein the memory storage unit, the plurality of crossbar switches, and the plurality of third level caches are interconnected via the communications network of the computer system, for controlling congestion when sending data from a first third level cache to a second third level cache, the method comprising the steps of:

(1) determining that a message in a first crossbar switch is a data message comprising one of a fetch request or a data transfer from a first third level cache;

(2) determining that a means for preventing the flow of data messages from a first crossbar switch to a memory storage unit is active;

(3) temporarily storing said data message in a message queue in said first crossbar switch;

(4) determining that a means for preventing the flow of data messages from said first crossbar switch to said memory storage unit is inactive;

(5) sending said data message to said memory storage unit;

(6) determining that said message in said memory storage unit is one of a data transfer, a purge request or a return request;

(7) determining that a means for preventing the flow of data messages from said memory storage unit to a second crossbar switch is active;

(8) temporarily storing the data message in a message queue associated with said memory storage unit;

(9) determining that a means for preventing the flow of data messages from said memory storage unit to a second crossbar switch is inactive; and

(10) sending said data message from said memory storage unit queue to a second third level cache.

9. The method of claim 8, further comprising a step performed before step (1) of (a) attempting to send said message from said third level cache to said first crossbar switch.

10. The method of claim 8, wherein step (5) further comprises a step of (b) detecting receipt of said message.

11. The method of claim 10, wherein step (5) further comprises a step of (c) incrementing a first outstanding message counter associated with said first crossbar switch.

12. The method of claim 8, wherein step (6) further comprises a step of (d) decrementing said first outstanding message counter.

13. The method of claim 8, wherein step (9) further comprises a step of (e) acknowledging receipt of said message by said first crossbar switch.

14. The method of claim 8, wherein step (9) further comprises a step of (f) incrementing a second outstanding message counter associated with said second crossbar switch.

15. A method, in a communications network of a computer system having a crossbar switch coupled to at least one third level cache and to at least one input/output module, wherein the crossbar switch, the third level cache, and the input/output module are interconnected via the communications network of the computer system, for controlling congestion when transmitting a message from the third level cache to the input/output module via the crossbar switch, the method comprising the steps of:

(1) sending a message from a third level cache to a message queue associated with a crossbar switch;

(2) incrementing a message queue counter associated with said crossbar switch;

(3) sending said message to an auxiliary buffer associated with said crossbar switch;

(4) releasing said message from said crossbar switch auxiliary buffer;

(5) sending said message to an input/output module from said crossbar switch; and (6) decrementing said crossbar switch message queue counter.

16. A method, in a communications network of a computer system, the computer system having a crossbar switch coupled to a third level cache and to an input/output module, wherein the crossbar switch, the third level cache, and the input/output module are interconnected via the communications network of the computer system, for preventing deadlock when transmitting messages from the third level cache to the input/output module, the method comprising the steps of:

(1) sending a message from a third level cache to a message queue associated with a crossbar switch;

(2) incrementing a message counter associated with said crossbar switch;

(3) sending said message to a memory storage unit;

(4) determining that a means for preventing the flow of messages from said crossbar switch to said input/output module is inactive; and (5) sending said message to said input/output module.

17. A method, in a communications network of a computer system, the computer system having memory storage unit, a plurality of crossbar switches coupled to a third level cache and to an input/output module, wherein the plurality of crossbar switches, the third level cache, and the input/output module are interconnected via the communications network of the computer system, for preventing deadlock when transmitting messages from the third level cache to the input/output module, the method comprising the steps of:

(1) sending a message from a third level cache to a message queue associated with a crossbar switch;

(2) incrementing a message counter associated with said crossbar switch;

(3) sending said message to a memory storage unit;

(4) determining that a means for preventing the flow of messages from said crossbar switch to an input/output module is active;

(5) sending said message to an auxiliary buffer associated with said crossbar switch;

(6) determining that a means for preventing the flow of messages from said crossbar switch to said input/output module is inactive; and (7) sending said message to said input/output module.

18. A method, in a communications network of a computer system, the computer system having memory storage unit and a plurality of crossbar switches coupled to a plurality of third level caches, wherein memory storage unit, the plurality of crossbar switches and the plurality of third level caches are interconnected via the communications network of the computer system, for preventing deadlock when transmitting messages from a first third level cache to a second third level cache, the method comprising the steps of:

(1) determining that a means for preventing the flow of messages from a first third level cache to a first crossbar switch is inactive;

(2) sending a message from said first third level cache to said first crossbar switch;

(3) sending a message from said first crossbar switch to a memory storage unit;

(4) determining that a means for preventing the flow of messages from a second crossbar switch to a second third level cache is inactive; and (5) sending said message from said second crossbar switch to said second third level cache.

19. The method of claim 18, further comprising a step performed before step (1) of (a) attempting to send said message from said first third level cache to said first crossbar switch.

20. The method of claim 18, wherein step (2) further comprises a step of (b) detecting receipt of said message.

21. The method of claim 20, wherein step (2) further comprises a step of (c) incrementing a first outstanding message counter associated with said first crossbar switch.

22. The method of claim 18, wherein step (4) further comprises a step of (d) temporarily storing said message in a main stream buffer set associated with said first crossbar switch.

23. The method of claim 22, wherein step (4) further comprises a step of (e) decrementing said first outstanding message counter.

24. A method, in a communications network of a computer system, the computer system having memory storage unit and a plurality of crossbar switches coupled to a plurality of third level caches, wherein memory storage unit, the plurality of crossbar switches and the plurality of third level caches are interconnected via the communications network of the computer system, for preventing deadlock when transmitting messages from a first third level cache to a second third level cache, the method comprising the steps of:

(1) determining that a means for preventing the flow of messages from said first third level cache to said first crossbar switch is active;

(2) preventing a message from being sent from said first third level cache to said first crossbar switch;

(3) determining that a means for preventing the flow of messages from said first third level cache to said first crossbar is inactive;

(4) sending said message from said first third level cache to said first crossbar switch;

(5) sending said message from said first crossbar switch to a memory storage unit;

(6) determining that a means for preventing the flow of messages from said second crossbar switch to said second third level cache is active;

(7) temporarily storing said message in an auxiliary buffer associated with said crossbar switch;

(8) determining that a means for preventing the flow of messages from a second crossbar switch to a second third level cache is inactive; and (9) sending said message from said second crossbar switch auxiliary buffer to said second third level cache.

25. The method of claim 24, further comprising a step performed before step (1) of (a) attempting to send said message from said first third level cache to said first crossbar switch.

26. The method of claim 24, wherein step (4) further comprises a step of (b) detecting receipt of said message.

27. The method of claim 26, wherein step (4) further comprises a step of (c) incrementing a first outstanding message counter, wherein said first outstanding message counter is associated with said first crossbar switch.

28. The method of claim 24, wherein step (8) further comprises a step of (d) temporarily storing said message in a main stream buffer set associated with said first crossbar switch.

29. The method of claim 28, wherein step (8) further comprises a step of (e) decrementing said first outstanding message counter.

30. A system, in a communications network of a computer system, the computer system having a memory storage unit coupled to a plurality of crossbar switches, each one of the plurality of crossbar switches being coupled to at least one third level cache, wherein the memory storage unit, the plurality of crossbar switches, and the third level caches are interconnected via the communications network of the computer system, for controlling congestion when sending data between the third level caches and the memory storage unit, comprising:

data flow control means for controlling the flow of data, comprising:

means for preventing a first crossbar switch from sending data to a memory storage unit;

means for preventing said memory storage unit from sending data to said first crossbar switch;

means for preventing a second crossbar switch from sending data to said memory storage unit;

means for preventing said memory storage unit from sending data to said second crossbar switch;

command flow control means for controlling the flow of commands, comprising:

means for preventing said first crossbar switch from sending commands to said memory storage unit;

means for preventing said memory storage unit from sending commands to said first crossbar switch;

means for preventing said second crossbar switch from sending commands to said memory storage unit; and means for preventing said memory storage unit from sending commands to said second crossbar switch.

31. A system in a communications network of a computer system, the computer system having a plurality of crossbar switches coupled to a plurality of third level caches and a plurality of input/output modules, the third level caches being coupled to a plurality of processors, wherein the plurality of input/output modules, plurality of crossbar switches, plurality of third level caches, and plurality of processors are interconnected via the communications network of the computer system, for preventing deadlock when transmitting messages within the computer system using the communications network, the system comprising:

means for preventing the crossbar switches from sending messages to the processors via the input/output modules;

means for preventing the processors from sending messages to the crossbar switches via the input/output modules;

means for preventing the crossbar switches from sending messages to the third level caches; and means for preventing the third level caches from sending messages to the crossbar switches.

* * * * *